United States Patent
Soccorsy et al.

(10) Patent No.: US 11,551,293 B1
(45) Date of Patent: Jan. 10, 2023

(54) COLLECTION SYSTEM AND METHOD

(71) Applicant: Wells Fargo Bank, N.A., San Francisco, CA (US)

(72) Inventors: Benjamin Soccorsy, Larkspur, CA (US); Larry Tewell, Draper, UT (US); Susanne Carr, Oakland, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 257 days.

(21) Appl. No.: 16/123,014

(22) Filed: Sep. 6, 2018

Related U.S. Application Data

(63) Continuation of application No. 14/481,643, filed on Sep. 9, 2014, now Pat. No. 10,242,402, which is a continuation-in-part of application No. 12/509,300, filed on Jul. 24, 2009, now Pat. No. 9,552,610.

(60) Provisional application No. 61/876,202, filed on Sep. 10, 2013.

(51) Int. Cl.
*G06Q 40/02* (2012.01)
*H04L 67/10* (2022.01)

(52) U.S. Cl.
CPC ........... *G06Q 40/025* (2013.01); *H04L 67/10* (2013.01)

(58) Field of Classification Search
CPC .................................................. G06Q 40/025
USPC ........................................................ 705/38
See application file for complete search history.

(56) References Cited

U.S. PATENT DOCUMENTS

| | | |
|---|---|---|
| 6,567,850 B1 | 5/2003 | Freishtat et al. |
| 6,871,220 B1 | 3/2005 | Rajan et al. |
| 7,383,215 B1 | 6/2008 | Navarro et al. |
| 7,606,752 B2 | 10/2009 | Hazlehurst et al. |
| 7,899,902 B2 | 3/2011 | Hyotani et al. |
| 7,970,676 B2 | 6/2011 | Feinstein |
| 8,036,984 B2 | 10/2011 | Elterich |
| 8,645,263 B1 | 2/2014 | Seel et al. |
| 8,769,412 B2 | 7/2014 | Gill et al. |
| 8,935,754 B2 * | 1/2015 | McCann ............. H04W 12/069 726/4 |
| 8,949,840 B1 | 2/2015 | Pulford et al. |
| 8,953,754 B1 * | 2/2015 | Simon ................ H04M 3/5166 379/88.04 |

(Continued)

FOREIGN PATENT DOCUMENTS

WO   WO-2022017619 A1 *  1/2022

OTHER PUBLICATIONS

Borders, Aberdeen Leila; Dissertation or Thesis: The impact of customer-initiated influence tactics in global account relationships; ProQuest Dissertations Publishing, 2002. 3044283; (Year: 2002).*

(Continued)

*Primary Examiner* — Hani M Kazimi
*Assistant Examiner* — Hatem M Ali
(74) *Attorney, Agent, or Firm* — Foley & Lardner LLP

(57) ABSTRACT

A computer-implemented method for initiating online collections that includes determining a current status of an account held by an account holder, determining a real-time financial profile of the account holder using information on the banking institution computer systems and third party information providers and displaying a customized status message based on the account holder's financial profile. The method provides remediation options to the account holder.

30 Claims, 30 Drawing Sheets

(56) References Cited

U.S. PATENT DOCUMENTS

| | | | |
|---|---|---|---|
| 2003/0074290 A1* | 4/2003 | Clore | G06Q 40/00 |
| | | | 705/35 |
| 2005/0211765 A1 | 9/2005 | Brown et al. | |
| 2005/0273442 A1 | 12/2005 | Bennett et al. | |
| 2006/0010066 A1 | 1/2006 | Rosenthal et al. | |
| 2008/0065520 A1 | 3/2008 | Hazlehurst et al. | |
| 2008/0201248 A1 | 8/2008 | Wellons et al. | |
| 2008/0301042 A1 | 12/2008 | Patzer | |
| 2008/0306846 A1 | 12/2008 | Ferguson | |
| 2009/0076972 A1 | 3/2009 | Witchel et al. | |
| 2009/0164365 A1 | 6/2009 | Dragt et al. | |

OTHER PUBLICATIONS

Romeiras de Lemos, Maria Teresa; Sustainable Competitive Advantage in PFI: A Systematic and Holistic Approach to Identify the CSFs in Risk Management in PFI, Taking into Account the Whole Life Cycle; ProQuest Dissertations Publishing, 2002. 27792784 (Year: 2002).*

Tata, Jasmine; The Influence of Accounts on Perceived Social Loafing in Work Teams; International Journal of Conflict Management; 2002; 13, 3; ProQuest Central p. 292 (Year: 2002).*

Borders, Aberdeen Leila; Dissertation or Thesis: The impact of customer-initiated influence tactics in global account relationships; ProQuest Dissertations Publishing, 2002. 3044283; (Year: 2002) (Year: 2002).*

Romeiras de Lemos, Maria Teresa; Sustainable Competitive Advantage in PFI: A Systematic and Holistic Approach to Identify the CSFs in Risk Management in PFI, Taking into Account the Whole Life Cycle; ProQuest Dissertations Publishing, 2002. 27792784 (Year: 2002) (Year: 2002).*

Tata, Jasmine; The Influence of Accounts on Perceived Social Loafing in Work Teams; International Journal of Conflict Management; 2002; 13, 3; ProQuest Central p. 292 (Year: 2002) Cycle; ProQuest Dissertations Publishing, 2002. 27792784 ( Year: 2002) (Year: 2002).*

Borders, Aberdeen Leila; Dissertation or Thesis: The impact of customer-initiated influence tactics in global account relationships; ProQuest Dissertations Publishing, 2002. 3044283: (Year: 2002) (Year: 2002) (Year: 2002).*

Romeiras de Lemos, Maria Teresa; Sustainable Competitive Advantage in PFI: A Systematic and Holistic Approach to Identify the CSFs in Risk Management in PFI, Taking into Account the Whole Life Cycle; ProQuest Dissertations Publishing, 2002. 27792784 (Year: 2002) (Year: 2002) (Year: 2002).*

* cited by examiner

Financial Institution Logo

◀ Back to Account Summary —970

Payment Programs Overview —960

XXXX XXXX 1234

Special Offer Available For You

Congratulations, you have been approved for a settlement offer of $4,819.69 as settlement in full of the above referenced account.

Once the payment has been received by 03/22/2009, Wells Fargo will consider this account settled.

By accepting this offer, You will be able to pay your debt down much faster [value statement]

To accept this offer click "Yes, I can do this" below. You will be asked to enter in a funding account for the payments and then click 'schedule payments' to begin.

[ Show me other options ]   [ Yes, I can do this ]
         950                       940

Activity Summary

Total Amount Due          $161.00
Current balance          $5,374.97

Legal text here. Lorem ipsum dolor sit amet, consectetur adipiscing elit. In facilisis, ante quis consequat ultrices, lectus est iaculis nisl, id venenatis lectus diam quis enim. Suspendisse viverra, est consectetur consectetur faucibus, orci purus commodo nulla, in condimentum ligula elit quis metus. Quisque metus. Nunc pulvinar ligula ac diam. Phasellus lobortis eros ut urna. Maecenas congue.

🔒 Online Security Guarantee

Payment Programs
Payment Programs Overview
Make a Payment Now
Set Up Multiple Payments
Make a Promise to Pay

Manage Account / Support
Add/Edit Pay From Account
Update Contact Information
Service Center
Speak to a Representative

Learning and Planning
Budget Assistance
Bankruptcy Information
Budget Calculator

Payment Program Service Team
📞 1-8XX-XXX-XXXX
24 hours a day, 7 days a week

☐ Help

FIG. 9

Payment Programs Overview

XXXX XXXX 1234

Special Offer Available For You

Your almost ready to begin making payments. Confirm the payment schedule and funding accounts below and click Schedule Payment Now to begin making your payments.

We will then confirm your payments have been scheduled.

You can edit or delete a payment by selecting the payment in the Transaction History table on the overview page.

| Funding Account Add/Edit | Payment Delivery Date | Payment Amount |
|---|---|---|
| Chase Checking XXXXX8827 | 05/15/2009 | $150.29 |
| Chase Checking XXXXX8827 | 05/15/2009 | $150.29 |
| Chase Checking XXXXX8827 | 05/15/2009 | $150.29 |

☐ I'd like to receive an email reminder [ 10 ] days before my payment is sent.

[Cancel] [Schedule Payment Now]

Payment Programs
Payment Programs Overview
Make a Payment Now
Set Up Multiple Payments
Make a Promise to Pay

Manage Account / Support
Add/Edit Pay From Account
Update Contact Information
Service Center
Speak to a Representative

Learning and Planning
Budget Assistance
Bankruptcy Information
Budget Calculator

Payment Program Service Team
☎ 1-8XX-XXX-XXXX
24 hours a day, 7 days a week

FIG. 10

Payment Programs Overview

XXXX XXXX 1234

⌕ Back to Account Summary

☒ Help  ⛨ Online Security Guarantee

A Special Offer For You

You are currently enrolled in the $100 payment offer.

Balance Remaining  $438.99
Payments Remaining  5
Expected Payoff  07/30/2009

Activity Summary

| Total Amount Due | $161.00 |
| --- | --- |
| Current balance | $5,374.97 |

Transaction History for This Account

To edit or delete a payment, click on the created date.

| Created Date | Description | Amount |
| --- | --- | --- |
| 01/13/2009 | Delivered | $102.45 |
| 01/13/2009 | Delivered | $102.45 |
| 01/13/2009 | Scheduled | |
| 01/13/2009 | Scheduled | |

Payment Programs
Payment Programs Overview
Make a Payment Now
Set Up Multiple Payments
Make a Promise to Pay
Apply for a Payment Program

Manage Account / Support
Add/Edit Pay From Account
Update Contact Information
Service Center
Speak to a Representative

Learning and Planning
Budget Assistance
Bankruptcy Information
Budget Calculator

Payment Program Service Team
☏ 1-8XX-XXX-XXXX
24 hours a day, 7 days a week

Financial Institution Logo

How would you like to make this payment?

Payment Amount
- ● $1,070.00 - Total Amount Due (Two months' payments plus $35.00 in late fees and charges)
  Prevents further late fees, charges and interest. Plus, it protects your credit score.
- ○ $535.00 (One month's payment)
  One month's payment. Saves you money and helps protect your credit. Leaves *$535.00 remaining due.* close more payment options

| Frequency and rules | Preferences | | | | | | | | |
|---|---|---|---|---|---|---|---|---|---|
| | Digital | | | | | Non-digital | | | |
| | Email | Onto chat | Text SMS | Web based | ATM | Other | Call ctr agents | Call lists | Letter | Brick & mortar | Other |
| Always | X | | | | | | | | | | |
| Never | | | | | X | | | | | | |
| Sometime | | | | | | | | | | | |
| Once a month | | | | | | | | X | | | |
| If by X, then not by Y | | | | | | | | | | | |
| When urgent | | | | | | | | | | X | |
| When owed amount is over $ | | | | | | | | | | | |
| Preferred | | | | | | | | | | | |
| Always | | | | | | | | | | | |

FIG. 30

COLLECTION SYSTEM AND METHOD

CROSS-REFERENCE TO RELATED PATENT APPLICATIONS

The present application is a continuation application of U.S. patent application Ser. No. 14/481,643, entitled "Collection System and Method" and filed on Sep. 9, 2014, which claims priority to U.S. Provisional Patent Application No. 61/876,202, entitled "Collection System and Method" and filed on Sep. 10, 2013, and which is also a continuation-in-part of U.S. patent application Ser. No. 12/509,300, entitled "Online Collection Portal System and Method" and filed on Jul. 24, 2009. Each of the foregoing applications is hereby incorporated by reference in its respective entirety.

BACKGROUND OF THE INVENTION

On-line banking tools offer customers of financial institutions a convenient way to manage their accounts without having to visit brick and mortar locations. Consumer and commercial on-line banking tools are available and permit account holders to perform account management operations such as funds transfers, bill payment, cash and treasury management, investment, procurement, international, trust, and credit and loan services, and so on.

Currently, banking institutions continue to need to reach their account holders regarding when their accounts have an adverse account status and for performing remediation (e.g., collections) activities. While existing on-line banking tools have proved useful, an ongoing need exists for further improvements.

SUMMARY OF THE INVENTION

Example embodiments relate to a computer-implemented method for initiating account status remediation that includes receiving login information from an account holder, responding to the login information by accessing a database, and retrieving information from the database regarding an account held by the account holder. The method further includes generating a display for the account holder via a user computing device. The display shows a status message generated based on the information retrieved from the database. The message informs the account holder of an adverse account status of the account that needs to be remediated.

Example embodiments relate to a computer-implemented method for initiating account status remediation by receiving bank account log in information from an account holder, determining a current status of the account held by the account holder, and displaying a message to the account holder. The message informs the account holder of an adverse account status and provides remedial options.

Example embodiments relate to a computer-implemented method for initiating online collections by determining a real-time risk assessment for an account of an account holder using information in the banking institution computer systems and third party information providers. The method further comprises displaying a status message customized based on the risk assessment. The method allows the banking institution to vary the urgency of the displayed message.

BRIEF DESCRIPTION OF THE DRAWINGS

FIG. 5 is a screen display showing account summaries for various accounts held by an account holder.

FIG. 6 is a screen display showing account details for one of the accounts of FIG. 5.

FIG. 9 is a screen display showing a first payment program that may be offered to an account holder.

FIG. 10 is a screen display that may be provided to an account holder to provide details about a funding account to be used in connection with the payment program of FIG. 9.

FIG. 11 is a screen display that may be provided to an account holder to show terms and relate messages in connection with an accepted payment program.

FIG. 12 is a screen display that may be provided to an account holder in connection with a second payment program that may be offered to the account holder.

FIG. 15 is an overlay display that may be provided to an account holder in connection with the display from FIG. 14.

FIG. 18 is a screen display that may be provided to an account holder when the account holder selects the view more payment options link from FIG. 17.

FIG. 30 is a schematic diagram showing customer preferences according to an example embodiment.

DETAILED DESCRIPTION OF EXAMPLE EMBODIMENTS

Example embodiments disclosed herein assist customers cope with payment challenges, collect a debt and/or mitigate losses by using technology. Account holders interact with various entities on the Internet or a client side application by using computers, tablets, smartphones or the like. Account holders with an adverse account status may be reached via an online collection service instead via telephone and/or physical mail. Moreover, an Internet interaction is convenient and private for an account holder with an adverse account status. It may be efficient for an account holder to remedy the adverse account status without interacting with another individual that is employed by a collector or a creditor.

Many financial institutions offer more than one credit account to a single account holder. For example, a financial institution may provide its customer various credit accounts, such as but not limited to, a credit card, retail, PLL, direct auto loan, EFS, overdraft, home equity line, mortgage, and so on. The online collection system may utilize various online channels to reach an account holder with an adverse account status. For example, the online collection system may use an application that is being executed on a smart phone, tablet, laptop, computer or television screens. In other embodiments, the online collection system may be served using a web server to the user. The online collection system may include various capabilities, such as but not limited to interruptive sign-on messaging, persistent messaging, public website home page, email, proactive text messages, ATM messaging, charged-off accounts, on us (within a single institution) and off us payments (more than one financial institution). Other capabilities may include using future date payments, SMS (text) messaging, settlement offers, secure chat, schedule a call, online form, stay on track tools and payment reminders.

Figure 1:
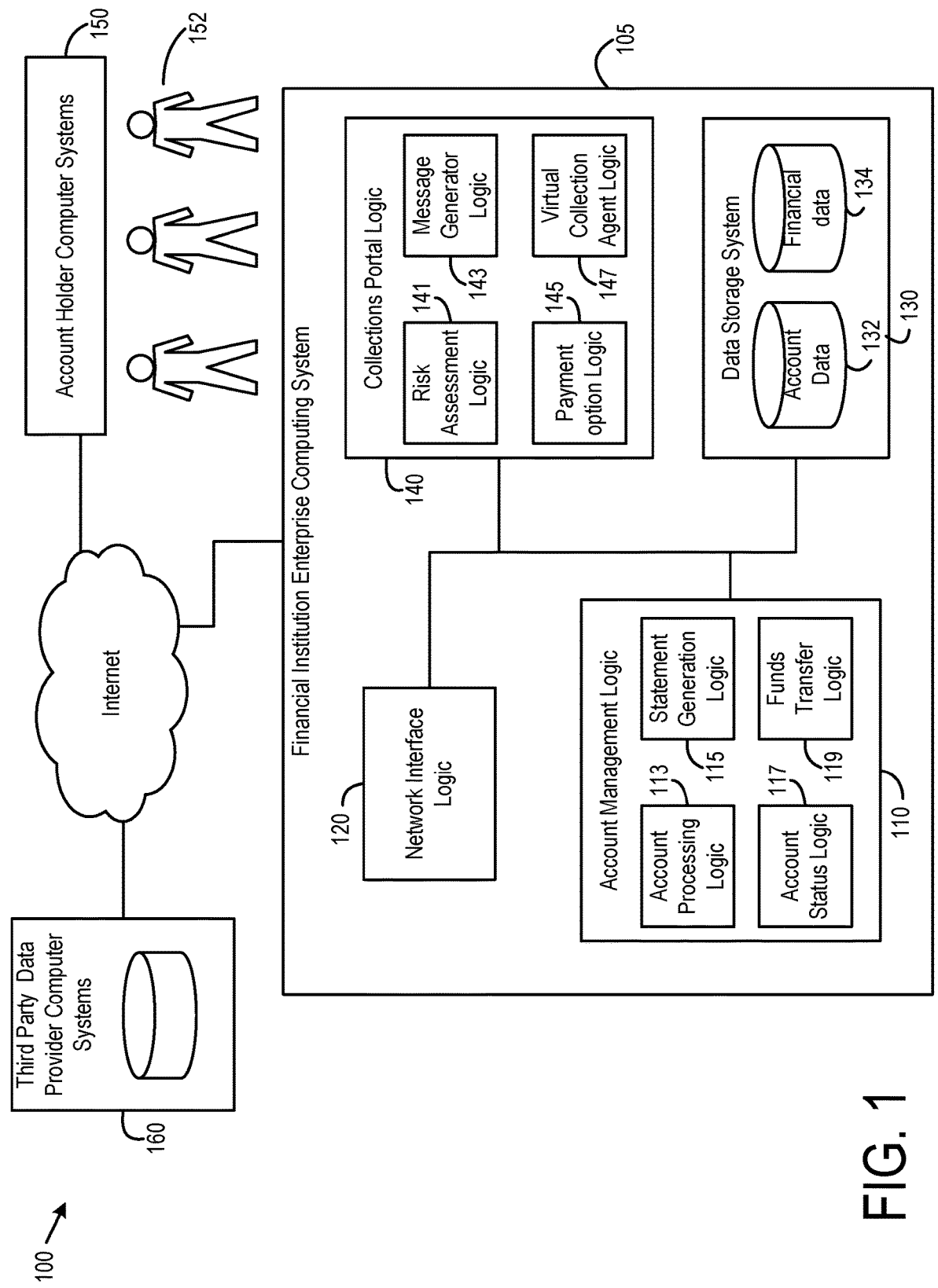
FIG. 1 is a schematic diagram of a data processing system according to an embodiment of the present disclosure.

Referring to FIG. 1, a data processing system 100 according to an example embodiment is shown. The data processing system 100 includes an enterprise computing system 105 that may include, among other systems, account management logic 110, network interface logic 120, data storage system 130, and collections portal logic 140. The data processing system 100 may further include account holder computer systems 150 and third party data provider computer systems 160.

In an example embodiment, the enterprise computing system 105 may be provided by a financial institution, such as a bank, and the account holder 152 may be a customer of the financial institution that accesses the system 105 through tellers at retail bank branches, through the Internet, or in another manner. The customers may, for example, access system 105 through an on-line banking area of a website of the bank. As another example, computing system 105 may be associated with other types of companies that maintain customer accounts, such as credit card issuers, mortgage companies, utility companies, insurance companies, and so on. As another example, part or all of computing system 105 may be associated with vendors to whom billing, collection, or call center operations are outsourced by other companies.

In the example where system 105 is provided by a financial institution, such as a bank, account management logic 110 may further include account processing logic 113, statement generation logic 115, account status logic 117, and funds transfer logic 119. Such logic may be implemented in a machine (e.g., one or more networked computer servers) comprising machine-readable media having instructions stored therein which are executed by the machine to perform the operations described herein.

The account processing logic 113 may perform account processing to process transactions in connection with the account(s) of an account holder 152, such as account debits and credits to checking and savings accounts, credits and debits to home mortgage and home equity accounts, credits and debits to student loan accounts, and so on. For example, in the context of checking accounts, the transactions may also include electronic bill payment transactions in which monies from the checking account of the user are used to pay bills received by the user. The account processing logic 113 may retrieve and store information in the data storage system 130 relating to the account data 132. Statement generation logic 115 may generate statements relating to accounts held by the account holder 152. Account status logic 117 may generate codes that indicate that an account has an adverse account status. An account may have an adverse account status for a variety of reasons. Examples of an adverse account status include a payment delinquency on a credit card or other loan, an overdrawn checking account, being over the credit limit on a credit card, excessive transactions on one account, suspicious or fraudulent transactions on an account, and so on. In the example described below, the adverse account status is assumed to be a payment delinquency on a loan.

The funds transfer logic 119 may be used to transfer funds between accounts of a single account holder 152 or between an account of an account holder 152 and a third party (which may or may not be another account holder). The funds transfer logic 119 may receive a fund transfer request from an account holder through a teller, through the on-line banking area of the website, or through other systems in the banking institution computer system 105, such as the collections portal logic 140, or other outside collections system. In response to a fund transfer request, the fund transfer logic 119 may transfer funds from an account that is not in default to an account that may be in default. The fund transfer logic 119 may perform the transfer of funds by updating the account data 132.

Network interface logic 120 may be used to connect the computing system 105 to the Internet to permit customers to use computers 150 to access computing system 105 through an on-line banking area of a website of the bank. For example, in the context of desktop/laptop computers, network interface logic 120 may comprise one or more web servers that provide a graphical user interface (e.g., a series of dynamically-generated web pages) for users that access system 105 through the web. The graphical user interface may be used to prompt the user to provide login information, passwords and other authentication information (i.e. tokens, pins, answers to personal questions, or the like), to provide the user with account information, and so on. Network interface logic 120 may also comprise other logic that is configured to provide an interface for other types of devices such as handheld mobile computing devices 150 (e.g., portable e-mail devices, cell phones, smart phones, and so on), ATMs, and server-based computing systems, and so on.

The data storage system 130 stores account data 132 and other financial data 134. The account data comprises account balance information for accounts held by the customers with the financial institution. The financial data 134 may comprise other financial information regarding the customers (e.g., in the form of a self-cure table for each customer) that may be gathered from internal and external sources. For example, financial data 134 may include a variety of information regarding any given customer such as, for example, balance trends, net worth, equity ratios, late payments, past collections histories or the like. The utilization of data 132 and 134 is described in greater detail below.

The collections portal logic 140 may be used to resolve the adverse account status associated with an account holder 152, in the illustrated example, assumed to be a delinquent payment(s) on a loan. The collections portal logic 140 includes risk assessment logic 141, message generator logic 143, payment option logic 145, and virtual collection agent logic 147. As indicated previously, part or all of computing system 105 may be associated with vendors to whom billing, collection, or call center operations are outsourced by other companies. Hence, for example, virtual collection agent logic 147 may be associated with a collection agent vendor rather than being part of the enterprise computing system 105 of the financial institution.

The risk assessment logic 141 may be used to generate a risk assessment (e.g., a risk score) in connection with an adverse account status. The risk assessment may, for example, be in the form of a risk score or other quantification indicating the probability of an adverse event occurring (such as delinquency or default on the account debt). For example, if the customer has missed a credit card payment, but account data for the customer indicates that the account balances of the customer have been relatively stable and the customer has cash available that is well in excess of what is needed to completely pay off the credit card, then the risk assessment logic may generate a risk score indicating that a relatively lower degree of risk. Conversely, if the account data for the customer indicates that the account balances of the customer have dropped significantly in recent months, and the customer has cash available that is significantly less than the outstanding credit card balance, then the risk assessment logic may generate a risk score indicating that a relatively higher degree of risk.

The risk assessment may be generated based on data 132 and 134. The account data 132 (e.g., the amount of the delinquency, the existence of other delinquencies, the account balances on other accounts held by the account owner, and so on) is updated at least on a daily basis and provides a real time indication of the financial status of the customer. The financial data 134 may comprise other financial information regarding the customers (e.g., in the form of a self-cure table for each customer). The financial data 134 may be updated in real time (e.g., in the case of data that is generated based on account data) or may be updated on at least a daily, weekly, monthly, or quarterly basis, depending on the data that is being updated.

The financial data 134 may include data from internal and external sources. The data from internal sources may include analytic data that is generated based on the account data 132 (e.g., account balance trends, net worth, equity ratios, late payments, past collections histories, number of days of delinquency, and so on), which may also be updated on a daily basis. The data from external sources 160 may include data from credit agencies, Dunn & Bradstreet, Hoovers, government agencies, and other institutions. For example, such data may include the credit score of the customer as provided by a credit reporting agency. The credit score may be retrieved in real time upon login or it may be retrieved and stored in advance (e.g., updated on a weekly or monthly basis). Such data from external sources 160 may also include economic data that is not personal to the customer but rather reflects broader economic trends that impact the customer more directly than the general population as a whole. For example, if the customer is known to have a particular profession, then the data may include data indicating the economic prospects for that profession. Likewise, if the customer is known to live in a particular geographic region (e.g., a particular MSA), then the data may include data indicating the economic prospects for that region. Such data may be updated regularly, for example, as new government reports are published containing such information. As another example, if the customer is known to be employed by a particular company, then the data may include information indicative of the economic prospects of that company (e.g., current stock prices of the company, stock price trends for the company, D&B ratings, and so on).

The message generator logic 143 may be configured to determine the form and content of an alert status message based on the risk assessment provided by the risk assessment logic 141 and other information. The message generator logic 143 may be programmed to present various predetermined messages with varying urgency for a delinquent account holder during an online customer collections process. For example, if the risk assessment logic 143 determines that there is a relatively high degree of risk associated with a particular delinquency, the status message may be provided in the form of a splash page which breaks the flow of the normal login process of the customer into an on-line banking area of the bank's website. Conversely, if the risk assessment logic 143 determines that there is a relatively low degree of risk associated with a particular delinquency, the customer may be allowed to proceed directly to the on-line banking area of the bank's website, and the status message may be provided in the form of a message that is placed adjacent other account information for the delinquent account of the account holder. Likewise, the content (e.g., wording) of the message may also be varied depending on the level of risk to reflect varying levels of urgency for the customer to resolve the delinquency.

Additionally, the message generator logic 143 may include a business rules engine that allows other messaging rules to be programmed and taken into account. Such rules may operate on data 132 and/or 134 (including data that is updated in real time) or may operate on other data. Such rules may be based on factors that are not risk-based, that is, that are not driven by the risk that the customer will be unable to repay the delinquent account but rather are driven by other considerations. One example of such a factor is legal/regulatory-based factors. For example, if a customer has declared bankruptcy, then it may not be legally permissible to transmit messages to the customer regarding the collection of delinquent accounts, even though the risk assessment generated by the risk assessment logic 141 would otherwise cause an urgent message to be transmitted. Hence, business rules may be programmed to prevent the transmission of such messages to a customer that has declared bankruptcy. As another example, different states have different requirements under state law regarding disclosures that must be provided to consumers. The content of the messages may be programmed via business rules to reflect such differences in state laws. That is, different business rules may be programmed which specify the content of disclosure messages for different states, such that a consumer located in a given state is provided with the correct disclosure message for that state. Another example of non-risk based factors is business operations-based factors. For example, a customer may have multiple delinquent accounts, each of which delinquencies alone merits a message. However, after a first splash screen is presented, the marginal utility of presenting the customer with additional splash screens may be deemed for business reasons to be minimal. Accordingly, business rules may be programmed to prioritize the accounts, such that a splash screen is generated only in connection with one of the accounts. Another example of non-risk based factors is customer relations-based factors. For example, if one of two joint account holders has passed away, it may be undesirable to contact the other account holder regarding account delinquencies, at least for a period of time. As such, a business rule may be implemented that prevents messages from being sent to the other account holder for a predetermined period of time after the passing of the first account holder.

Figure 7:
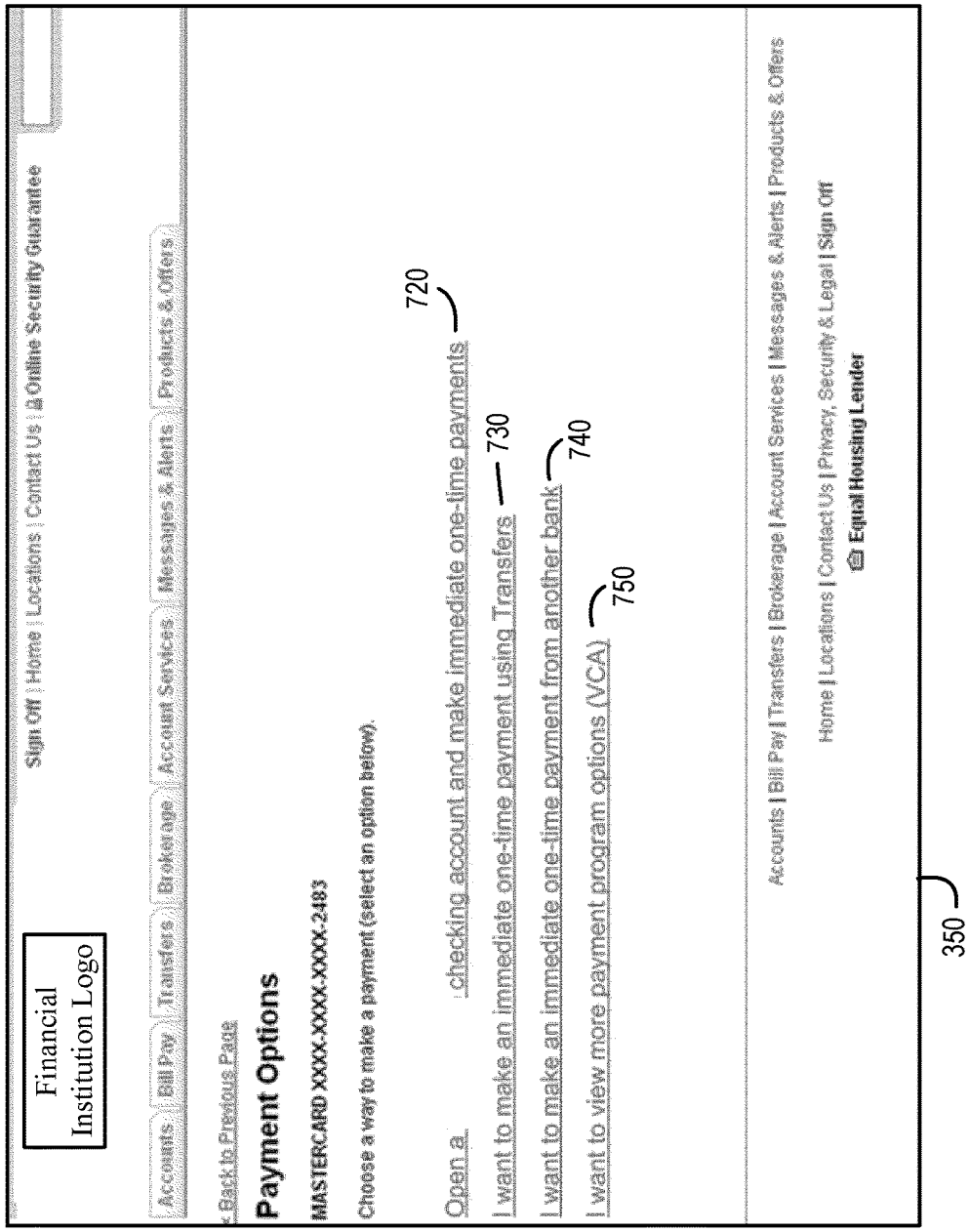
FIG. 7 is a screen display showing various payment options available to an account holder.

The payment option logic 145 generates payment options for self-cure of the delinquency by the account holder 152 (FIG. 7). The payment option logic 145 also determines whether to generate settlement options for the account holder 152 (FIGS. 8-12). This determination may be made upon login based on the account data 132 and based on the risk assessment generated by the risk assessment logic 141. For example, where the delinquency is determined to have a relatively low degree of risk, the payment option logic 145 may determine that no alternative settlement options are required. Alternatively, where the delinquency is determined to have a relatively high degree of risk, the payment option logic 145 may determine that alternative settlement options are required. Further, in this situation, the payment option logic 145 may proceed with generating such options. Hence, the customer may be provided with options to pay off a credit for less than the total amount owed. Again, the options may be generated based on the account data 132 and based on the risk assessment generated by the risk assessment logic 141. The settlement options may be displayed immediately (e.g., as part of a splash page) or in subsequent displays generated by the virtual collection agent logic 147.

The payment option logic 145 may also determine whether only a single settlement option is to be provided (e.g., in relatively lower risk situations) or whether multiple settlement options are to be provided (e.g., in relatively higher risk situations). The payment option logic 145 may also determine the order in which such options are provided, for example, based on past collections history. For example, if a delinquent account holder 152 has accepted a particular type of offer (i.e. a percentage payment, monthly payment plan, 12 month payment plan from a credit card, transfer from a particular checking account, paying the minimum or the like) in the past, then that type of offer may be one of the first offers presented to the account holder. In another embodiment the payment option logic 145 may identify for the account holder that the account holder has chosen a particular type of offer in the past. In yet another embodiment, the payment option logic 145 may access account data and store a favorite type of offer as selected by the account holder 152 during a previous last collections process.

The virtual collection agent logic 147 presents the settlement options to the account holder. The virtual collection agent logic 147 may also prompt the customer to answer a series of questions to resolve delinquent status of the account and bring the account to non-delinquent status. The virtual collection agent logic 147 may also manage payment streams from the account holder to pay off a delinquent account or to bring a delinquent account up to date. In one embodiment, the virtual collection agent logic 147 is provided by a third party (e.g., a vendor computer system that is separate enterprise computing system of the financial institution). From the perspective of the customer, however, such integration may be seamless and it may appear to the customer that the customer is still on the website of the banking institution. For example, the same URL may be used and a single sign-on process may be used (i.e., in which the customer only logs on once, namely, when first entering into an on-line banking session). In other embodiments, the virtual collection agent logic 147 may be provided as part of the enterprise computing system 105.

Figure 2:
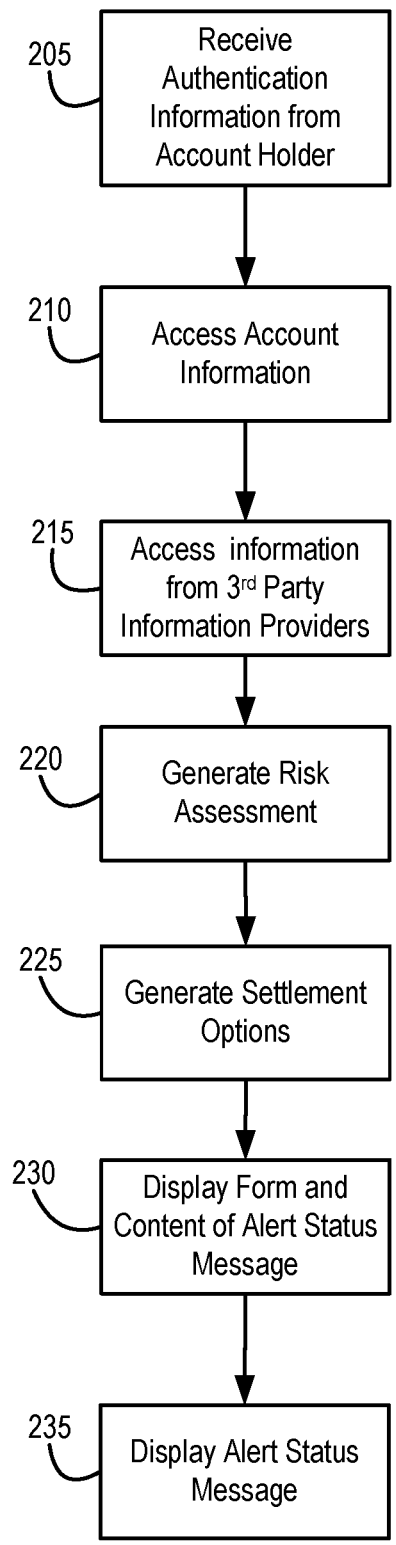
FIG. 2 is an example process that may be implemented using the system shown in FIG. 1.

Referring now to FIG. 2, FIG. 2 shows an embodiment of the present disclosure that may be implemented using the system shown in FIG. 1. At step 205, authentication information is received from an account holder 152. For example, the account holder 152 may be visiting the website of the financial institution and may provide login/password information to initiate an online banking session.

At step 210, the computer system 105 accesses account information for accounts held by the account holder 152 using the account status logic 117 to determine whether the account holder 152 has any delinquent accounts. The account status logic 117 may indicate that an account is delinquent, e.g., that the account holder is delinquent in making a payment on a loan. (For purposes of the present example, it is assumed that the account holder has a delinquent account. If there are no delinquent accounts, then the process shown in FIG. 2 terminates and the customer is delivered directly to on-line banking.) At step 215, information from external sources is accessed. As previously indicated, such information may be obtained in advance and stored in data storage system 130 where it can be accessed during user authentication.

At step 220, the risk assessment logic 141 generates a risk assessment. Based on the risk assessment, at step 225, the payment option logic 145 determines whether settlement options should be generated and, if so, generates such options. At step 230, the form and content of the alert status message is determined and, at step 235, the alert status message is displayed. The operation of system 105 in the context of steps 230 and 235 is described in greater detail in connection with FIGS. 3-12.

Figure 3:
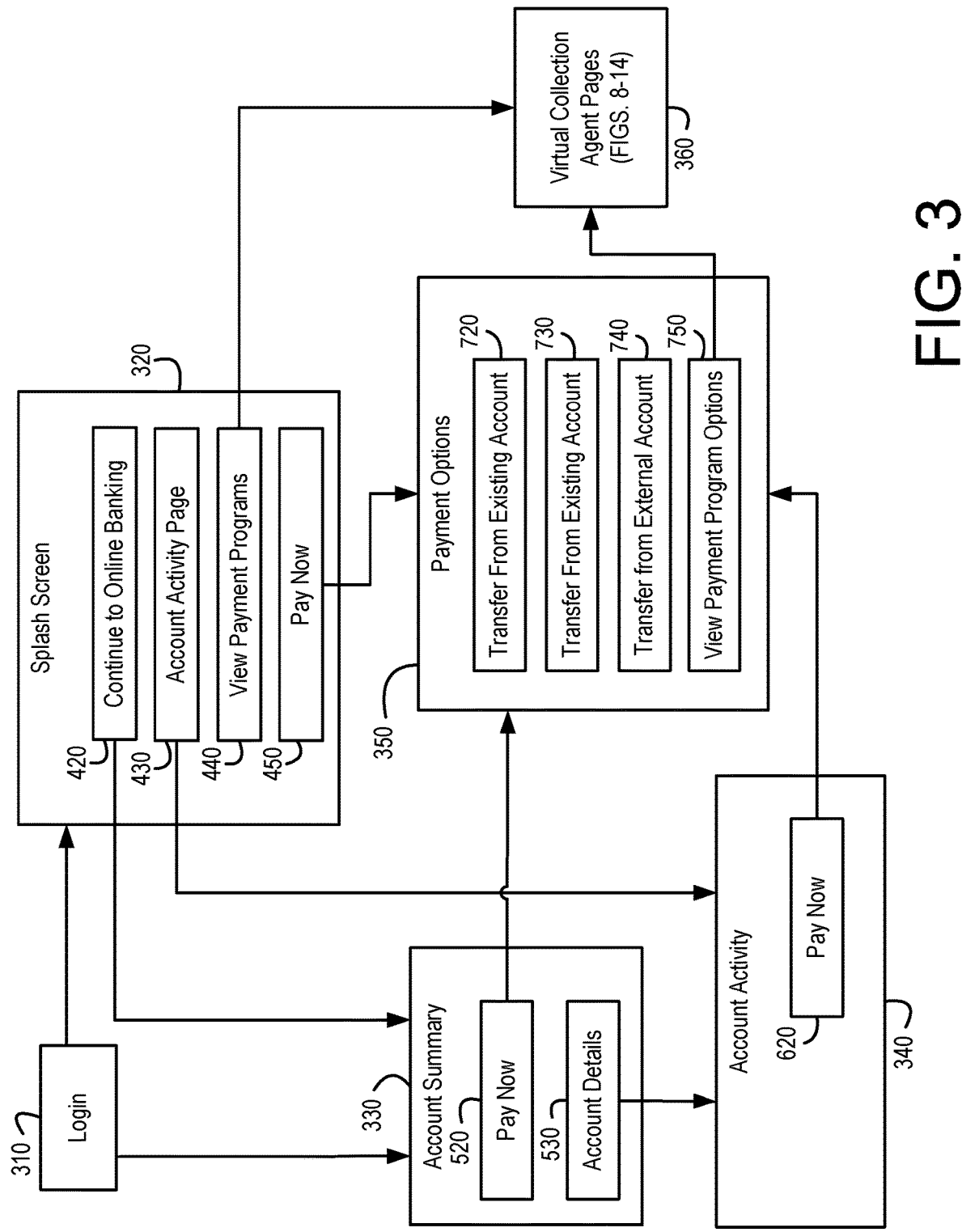
FIG. 3 is a sequence of displays that may be provided to an account holder using the system shown in FIG. 1 to begin a web based collections process.

Referring first to FIG. 3, FIG. 3 displays a sequence of displays (e.g., web pages) that may be generated for presentation to an account holder 152 by a computer system 150. In particular, display 310 is a login screen used to receive login information from an account holder 152. Upon receiving the login information, the account status logic 117 determines whether any of the accounts held by the user have an adverse account status (e.g., whether the user is late in making payments on any loans or credit cards) and the message generator logic 143 determines the form and content of messaging that is to be used in connection with such accounts, as previously described above in connection with steps 205-225 of FIG. 2.

Figure 4:
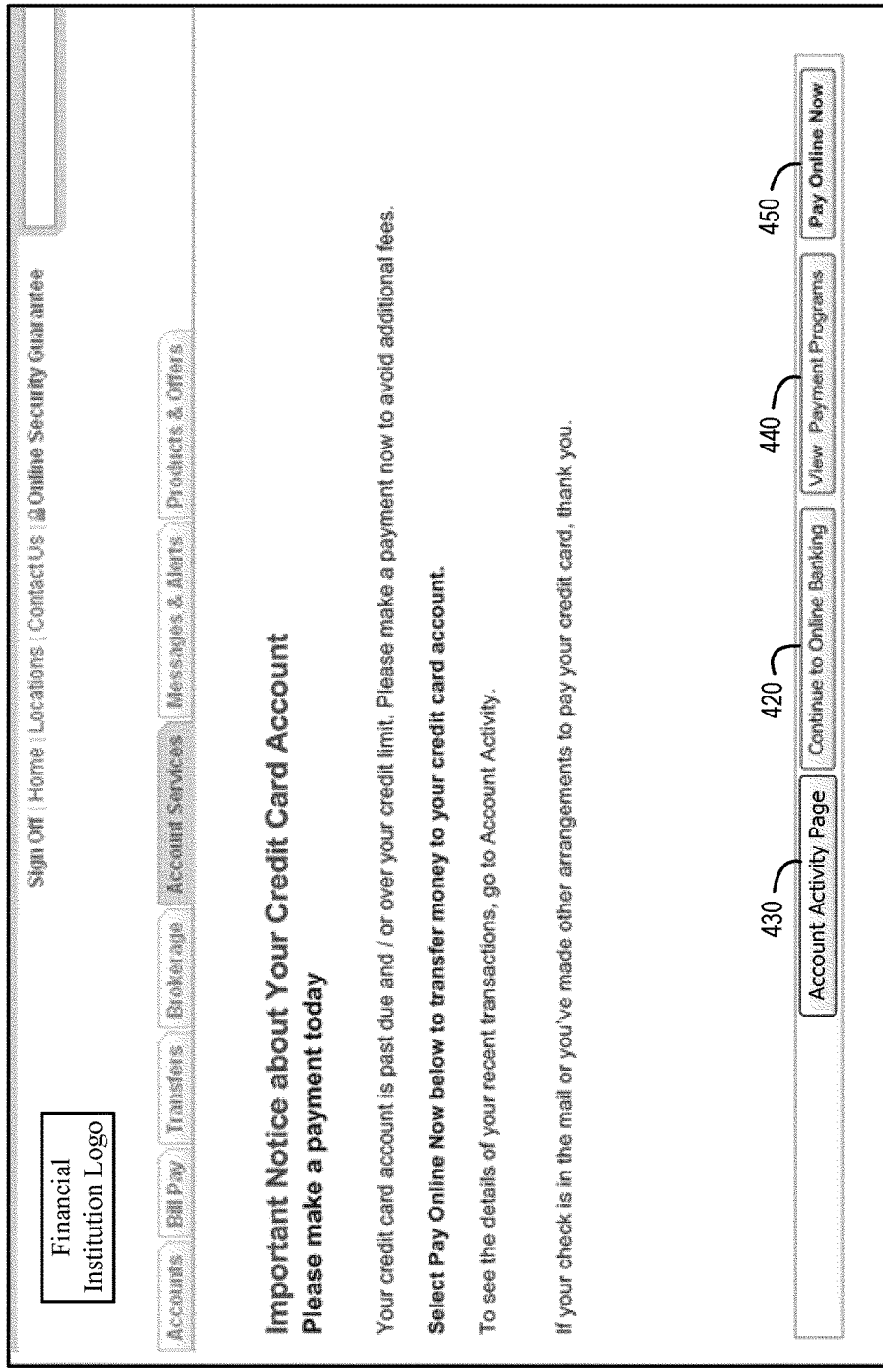
FIG. 4 is a customizable splash screen showing delinquent account status and various options that may be presented to an account holder.

The message generator logic 143 customizes the page flow based on the risk assessment (e.g., the risk score) provided by the risk assessment logic 141 and other information regarding the account holder 152. For example, if it is determined that the customer is to be presented with a splash page (at step 230 in FIG. 2), then the display sequence proceeds to splash screen 320. Splash screen 320 is shown in greater detail in FIG. 4. Referring to FIG. 4, FIG. 4 shows an example splash screen 320 that may be displayed to a delinquent account holder 152. In the context of a website, a splash screen is a page that breaks the normal flow of web pages provided to a user as would otherwise have been dictated based on the clicked-on links and other selections made by the user during the process of navigating the website. For example, for an on-line banking website, if an account summary page is typically the page that is displayed after user login, the splash screen may be a page that is displayed after login instead of the account summary page. In the illustrated example, the splash screen 320 is displayed instead of the account summary page, not in response to user inputs, but rather in response to other factors (relating to an account delinquency). In some embodiments, a splash screen may cover the entire display width and height, however, in other embodiments, the splash screen may only cover a rectangle near or around the center of the screen.

In the example shown in FIG. 4, the splash screen provides message content that states, "Your credit card account is past due and/or over your credit limit. Please make a payment now to avoid additional fees." As previously indicated, each splash screen message may be customized to the account holder 152 based on the risk assessment generated by the risk assessment logic 141 and based on the rules analysis performed by the message generator logic 143. As shown in FIG. 4, the splash screen may offer the choices including continuing to online banking (link 420), account activity page (link 430), viewing payment programs (link 440), or paying online now (link 450). Other embodiments of the splash screen may display the actual amount and the account that is currently delinquent. Yet other embodiments of the splash screen may display an option to transfer fund from a non-delinquent account to a delinquent account. In another embodiment, the splash screen may provide a settlement option and allow the account holder 152 to transfer funds from one account to the delinquent account pursuant to the settlement option.

Figure 5:
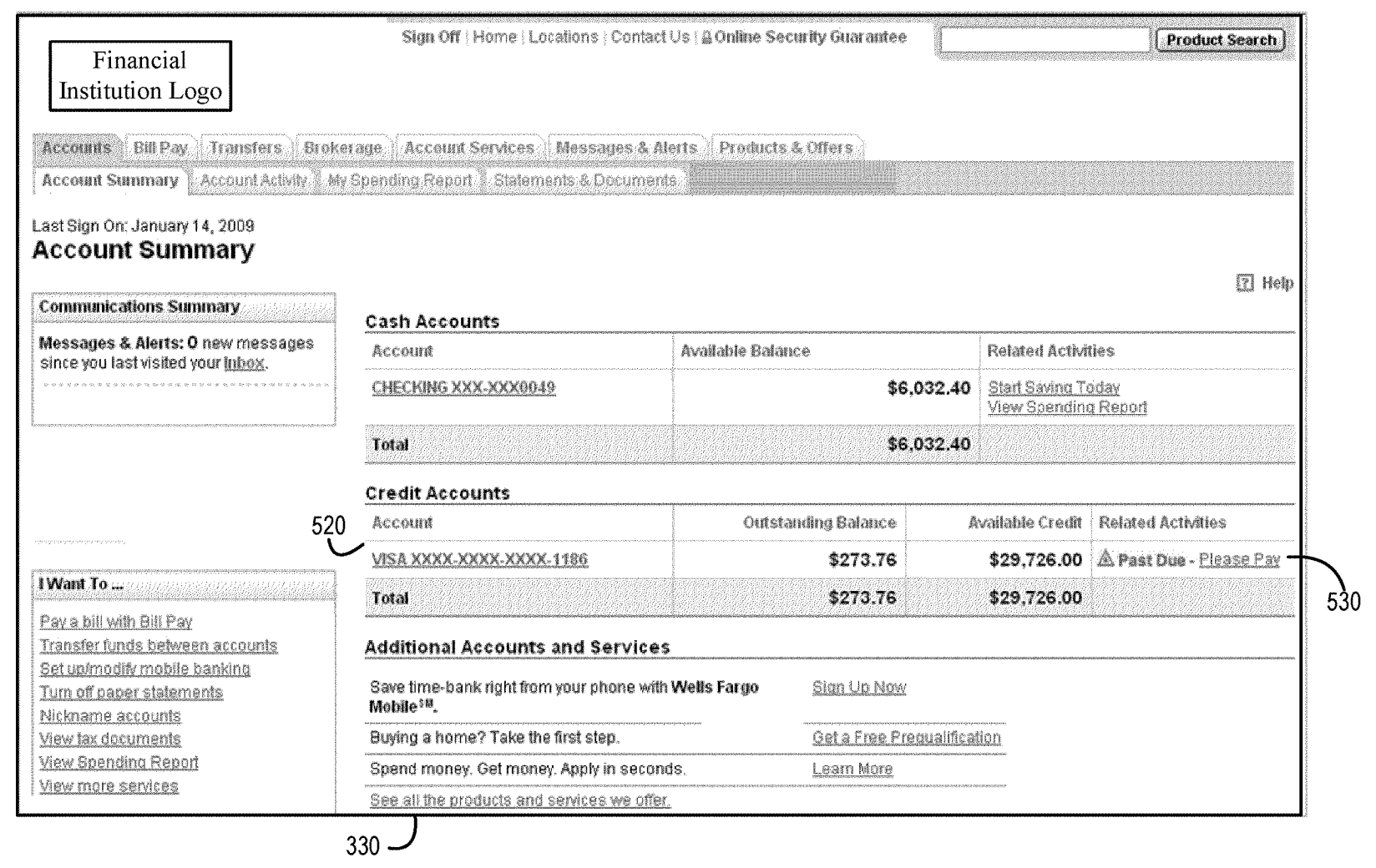

Referring now also to FIG. 5, FIG. 5 shows account summary page 330. If it is determined that the customer is not to be presented with a splash page (at step 230 in FIG. 2), then the display sequence proceeds to account summary page 330. Alternatively, the display sequence may proceed to account summary page 330 if the account holder 152 selects link 420 in FIG. 4.

The account summary page 330 allows the account holder 152 to access the account activity. In FIG. 5, for an example account holder 152 who is past due on a VISA® credit account 520, a message 530 is displayed which states: "past due-please pay." If the account holder clicks on the account number (which is a link), then the account holder is delivered to page 340, shown in FIG. 6. If the account holder 152 chooses to click on the message (which is also a link), then the account holder is delivered to page 350, shown in FIG. 7.

Figure 6:
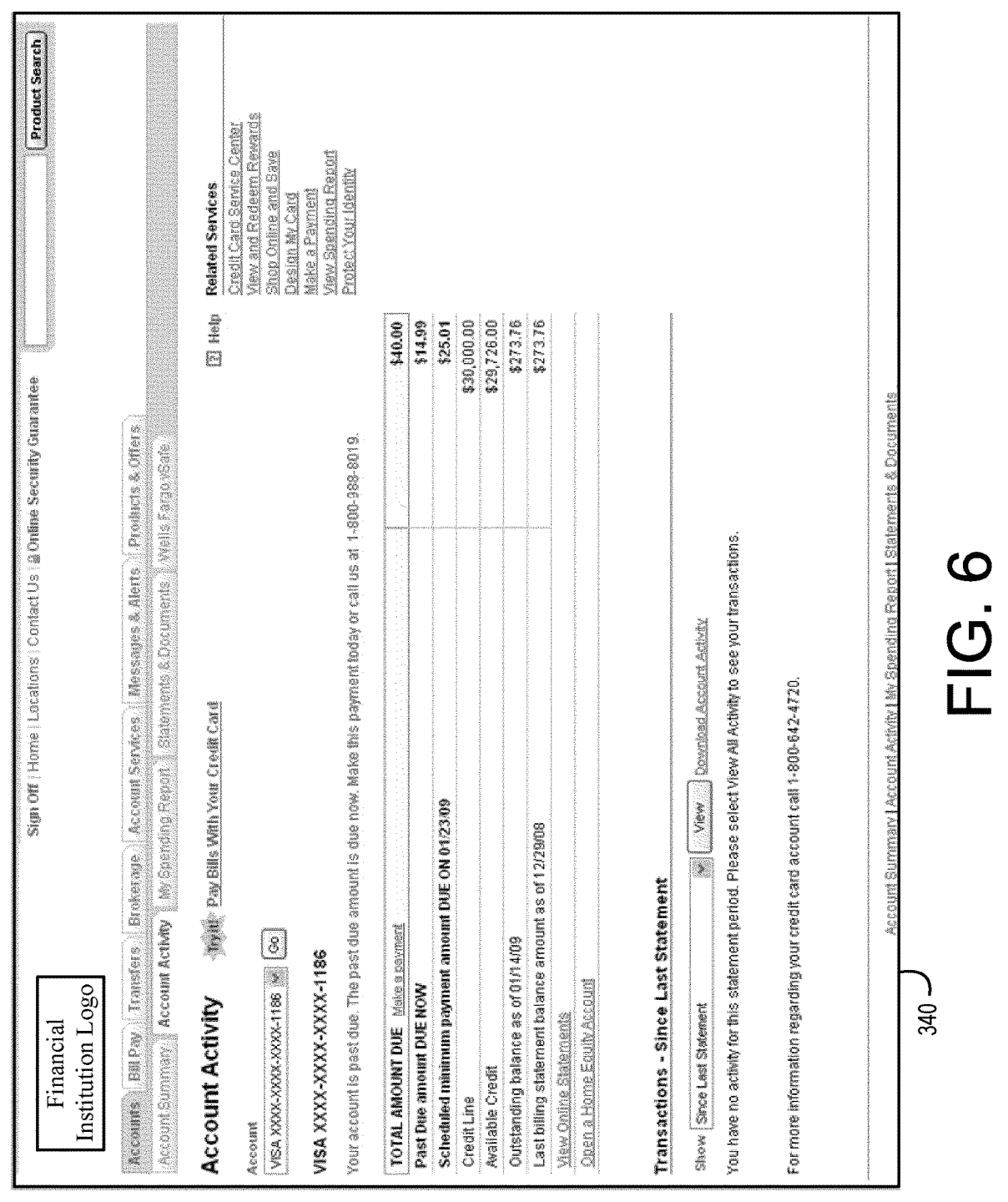

Referring to FIG. 7, FIG. 7 is an example display screen that may be shown if the account holder 152 selects link 450 in FIG. 4, link 530 in FIG. 5, or link 620 in FIG. 6. In particular, FIG. 7 allows the account holder 152 to choose between multiple options for making a payment, including opening a new account and transfer funds immediately (link 720), making an immediate on-time payment using transfers (link 730), making an immediate one-time payment from another bank (link 740), and viewing more payment program options (link 750). The payment program options may be generated by the payment option logic 145 based on real-time financial data. If the user selects link 730, the user is presented with payment options that include other banking institution accounts, other credit cards, pay pal accounts, travelers checks, Western Union or other forms for money transfers such as mobile payment via text messaging. If the user selects link 740, the user is delivered to a virtual collection agent, as described in greater detail in connection with FIGS. 8-12.

Figure 8:
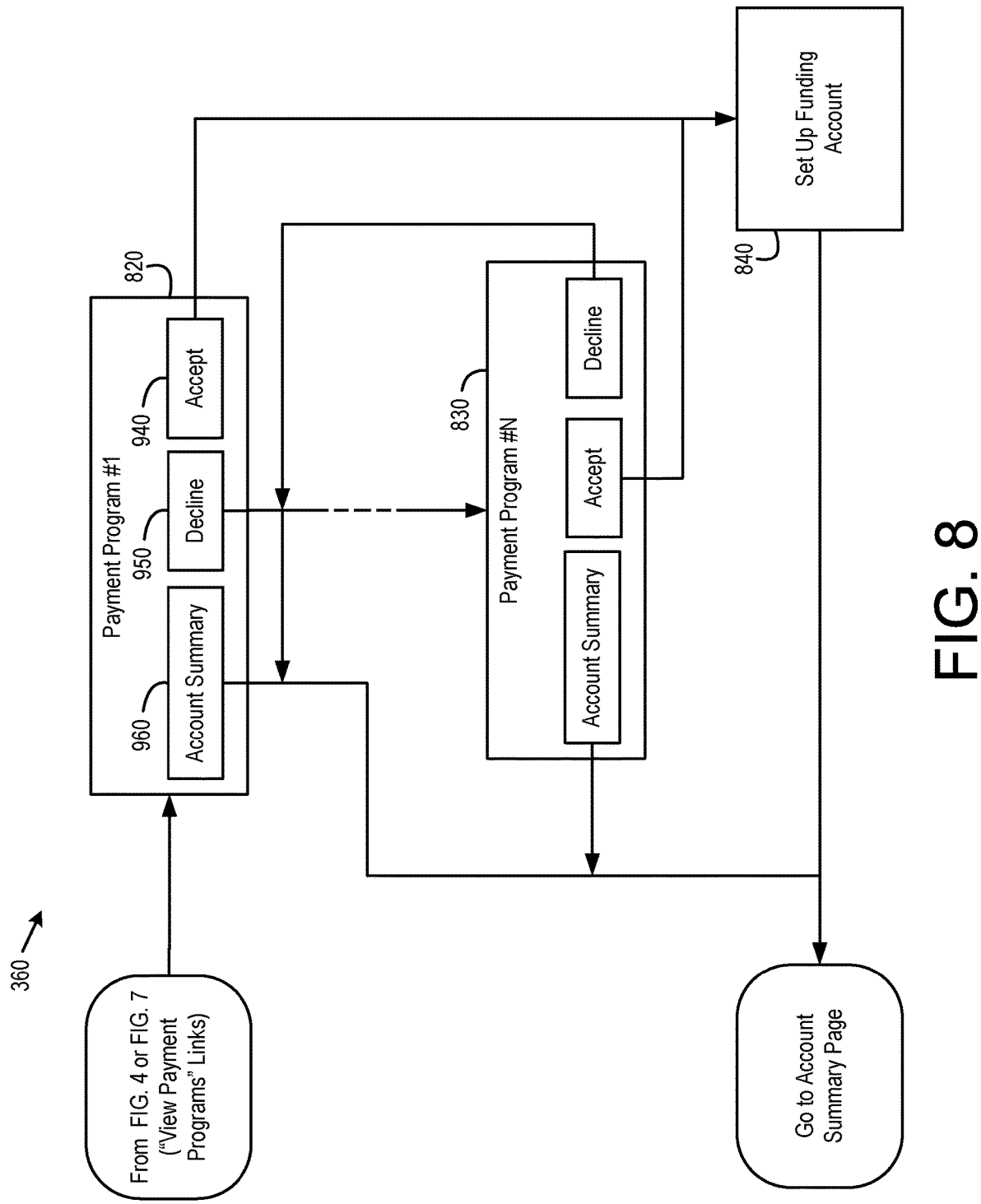
FIG. 8 is a sequence of displays that may be provided to an account holder using the system shown in FIG. 1 to provide a virtual collection agent.

Referring now to FIG. 8, FIG. 8 is sequence of displays that may be provided to an account holder using the system shown in FIG. 1 to provide a virtual collection agent. As shown in FIG. 8, the payment option logic 145 customizes the page flow based on the risk assessment (e.g., the risk score) provided by the risk assessment logic 141 and other information regarding the account holder 152. Thus, as shown in FIG. 8, each account holder that reaches the virtual collection agent is provided with at least one payment program to remediate their adverse account status (screen 820). However, the type of the payment program that is provided at screen 820, and thus the type of display that is provided, is determined by the payment option logic 145. For example, the payment program may involve debt cancellation, such that the account holder ultimately pays an amount of principal which is less than that owed. As another example, the payment program may involve a restructuring of debt, e.g., such that the account holder ultimately pays off the entire principal but the term of payments is extended or the interest rate is temporarily reduced. Likewise, some account holders may be provided with only one payment program option (screen 820), whereas other account holders may be provided with one or more additional payment program options (screen(s) 830). The payment option logic 145 determines the number and type of payment program options that are provided, and thus the page flow that the account holder experiences.

Referring now to FIG. 9, FIG. 9 is a screen display 820 showing a first payment program that may be offered to an account holder. In the example of FIG. 9, the account holder is provided with a settlement offer in which a portion of the debt owed by the account holder is canceled. If the account holder selects link 940, then the page sequence proceeds to screen 840, where the account holder is prompted to provide funding account information, as shown in FIGS. 10 and 11. If the account holder selects link 950, then the account holder may be provided with one or more additional payment program options, as previously described. If no more payment program options are provided, then the account holder may be returned to the account summary page 330 (e.g., potentially after further prompting to accept the payment program option provided via screen 820 or to take other remedial actions).

As shown in FIG. 9, the account holder is also provided with a link 960 to return directly to the account summary page 330, even in situations where the virtual collection agent logic 147 is associated with (e.g., outsourced to) a collection agent vendor rather than being part of the enterprise computing system 105 of the financial institution. Likewise, as will also be noted in FIG. 9, the screen display 820 continues to be branded with the logo 970 of the financial institution. As shown in FIGS. 10-11, the account holder may be provided with such links and branding throughout the pages 820-840 of the virtual collection agent. Thus, even in situations where the virtual collection agent logic 147 is associated with a collection agent vendor, the account holder is provided with a consistent, streamlined user experience.

Figure 12:
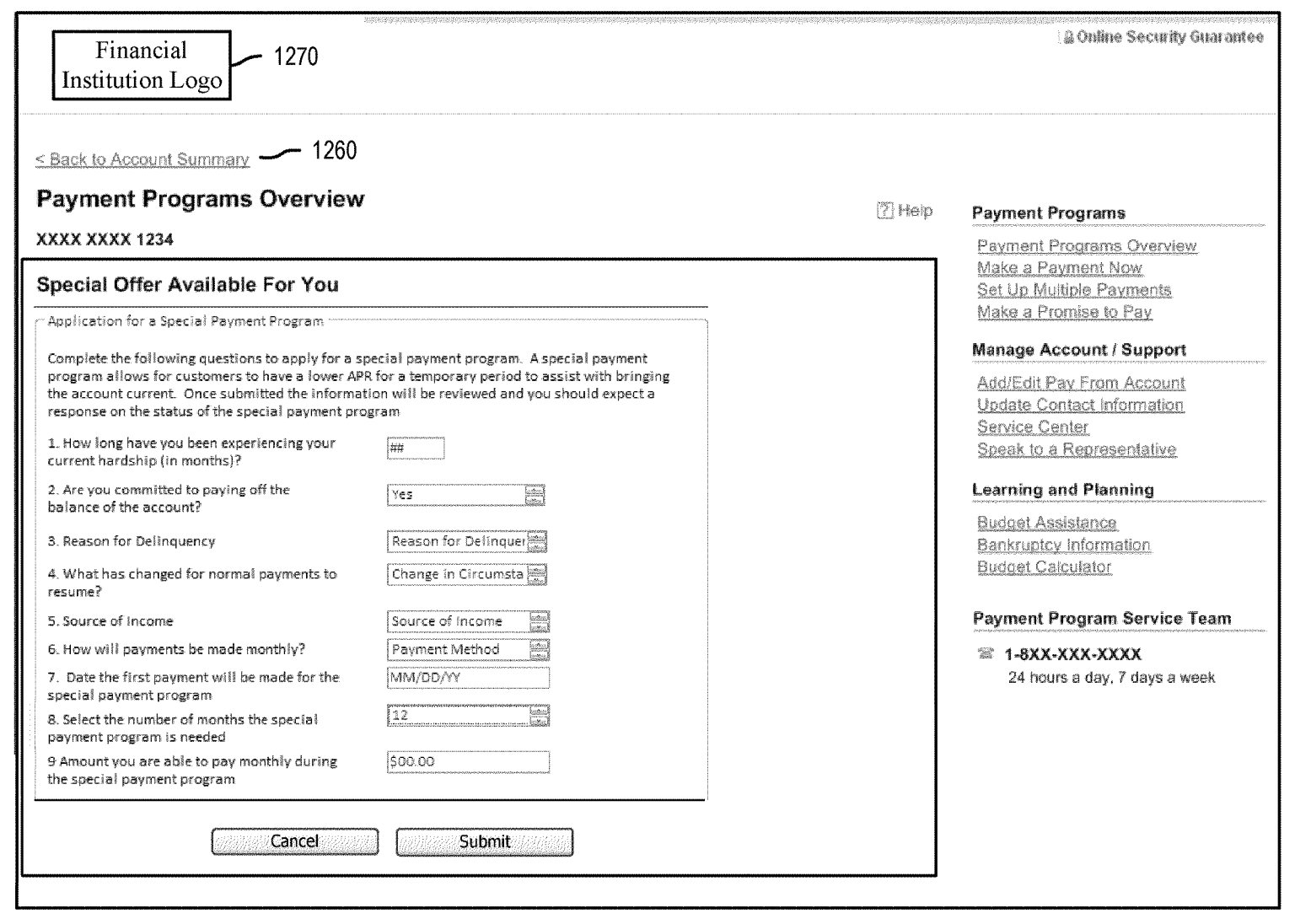

Referring now to FIG. 12, FIG. 12 is screen display that may be provided to an account holder in connection with a second payment program that may be offered to the account holder. In the example of FIG. 12, the account holder applies for a payment program in which the debt is restructured. Again, a link the screen display 830 includes a link 1260 to return directly to the account summary page 330 and continues to be branded with the logo 1270 of the financial institution.

Figure 13:
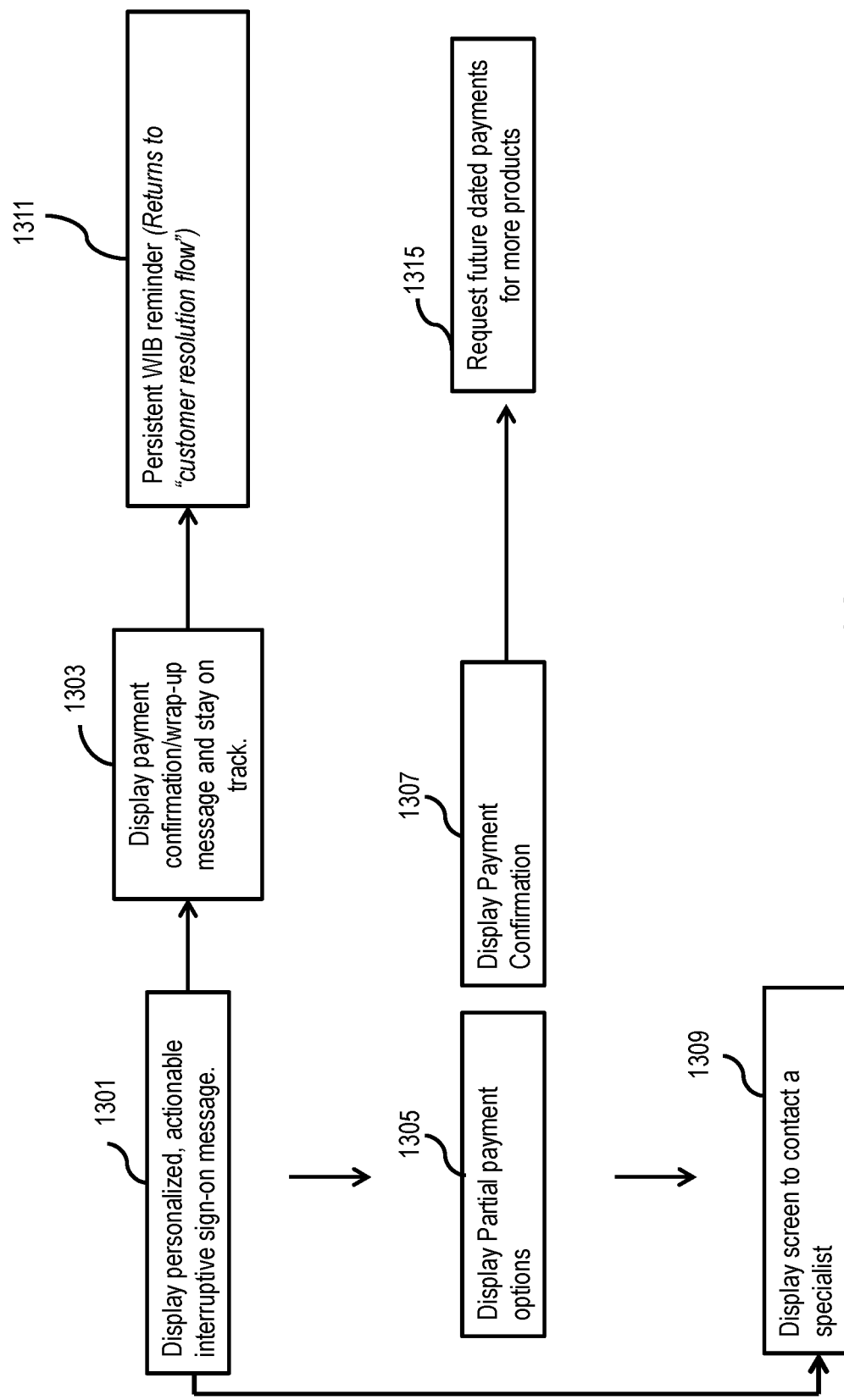
FIG. 13 is an example process that may be implemented using the system shown in FIG. 1.

FIG. 13 is an example process 1300 that may be implemented using the system shown in FIG. 1. Process 1300 includes various steps such as, 1301, 1303, 1305, 1307, 1309, 1311 and 1315. Prior to step 1301 an account holder with an adverse account status may log into a website or application by providing their authentication credentials (e.g., username, password, and/or security question answers). At step 1301, the collections portal logic 140 may generate and display a personalized, actionable interruptive sign-on message (e.g. FIG. 14). The message may inform the user that an account has been late by a specified number of days (i.e. 17 days, FIG. 14). At step 1301, the message may display the total amount that is owed by the account holder. The account management logic 110 may specify the payment account that has sufficient funds to pay the total amount that is owed by the account holder. At step 1301, the account holder may provide choices to the account holder to pay now, get payment assistance, or go to online banking.

If the account holder chooses to pay the total amount that is owed, then process 1300 goes to step 1303 which displays a payment confirmation and wrap-up message. (See, FIG. 16) In various embodiments, step 1303 may provide reminders to a user to stay current on their subsequent payments. Additionally at step 1303 a payment confirmation that indicates the date and time of the payment. Moreover, the confirmation message may also provide the available balance for the account that pays the delinquent account.

If the account holder chooses to get payment assistance at step 1301, the process 1300 may move to a pay partial screen (See, FIG. 17) in step 1305. In step 1305, the user/account holder may be provided with a partial amount that may be paid by the account holder. The partial payment amount may be generated by the payment option logic 145. In various embodiments, the partial payment option may also be generated based on the input provided from the risk assessment logic 141. After making the partial payment, the process 1300 may display the screen from step 1307.

At 1307, a payment confirmation for the partial payment is displayed. At step 1307, a message confirming the payment made by the user is displayed. Also at step 1307, the account holder is informed that the account holder owes a further payment. At step 1307, the account holder is offered the option to schedule a future payment for the remainder of the amount that is owned after the partial payment. At step 1307, the user may choose to select another partial payment or proceed to online banking.

When an account is seriously delinquent (e.g. greater than 60 days), at step 1309, the account holder may be provided with a display that maximizes opportunities to connect the account holder to a specialist. At step 1309 the user is offered the option to chat with an agent, talk to the agent via a telephone or schedule a call with an agent for a future time. The account holder may be also provided options to defer the payments, forbear, modify the loan or adjust the payment plan based on the type of loan.

When the account holder chooses to go to online banking after step 1301 or any of the other steps that have been previously discussed. When the account holder chooses "go to online banking", a persistent reminder may be displayed at the top of all displays that are generating during the entire banking session. The persistent message describes the adverse account status and the amount that is owed.

Figure 14:
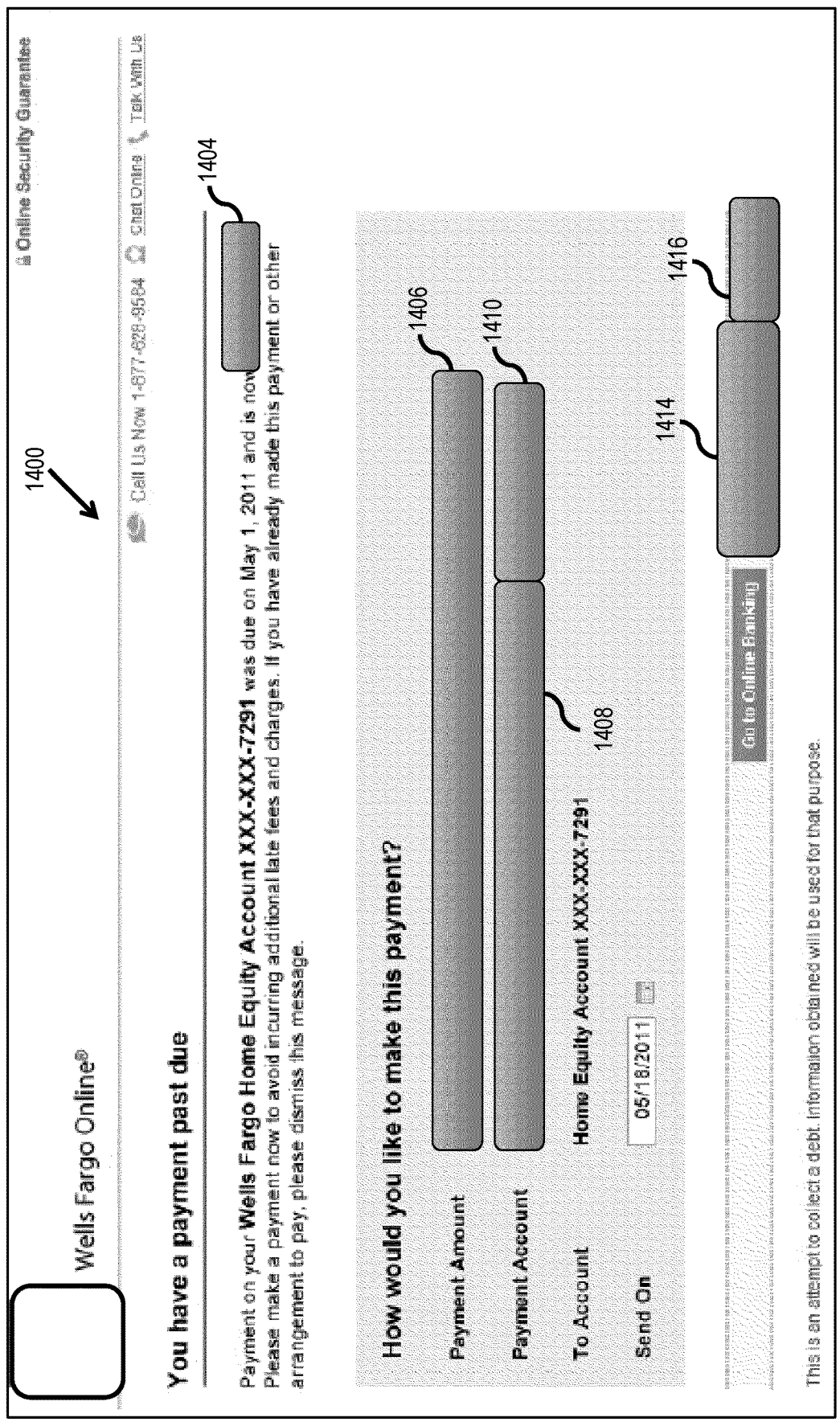
FIG. 14 is a screen display that may be provided to an account holder when at least one of the accounts held by an account holder is delinquent.

FIG. 14 is screen display that may be provided to an account holder when at least one of the accounts held by an account holder is delinquent. In FIG. 14, the screen display 1400 is generated using current data regarding the account holder's plurality of accounts. The screen displays the number of days 1404 that the adverse account is late. The screen display 1400 displays the payment amount 1406 that the adverse account is delinquent or the total amount that is due including all late fees and charges. The payment account 1408 may be listed in a pull down menu that lists a plurality of accounts (demand deposit accounts, credit card account, line of credit) that the account holder has with a plurality of financial institutions. The account holder may select from one or more accounts to pay the payment amount. After the payment account 1408 pull down menu, the display may include a view account details link 1410. The link 1410 allows the user to view the account transactions of the account that is selected in the pull down menu. (See, FIG. 15) The display shown in FIG. 14 is the dynamic and interruptive sign-on message and it provides the account holder with options to pay (i.e. without the account holder having to click through any additional links or going through any other web pages). In other embodiments, the user may select the date on which the payment is sent to the creditor. To complete the payment process, the account holder/user may select the pay now button 1416.

Figure 15:
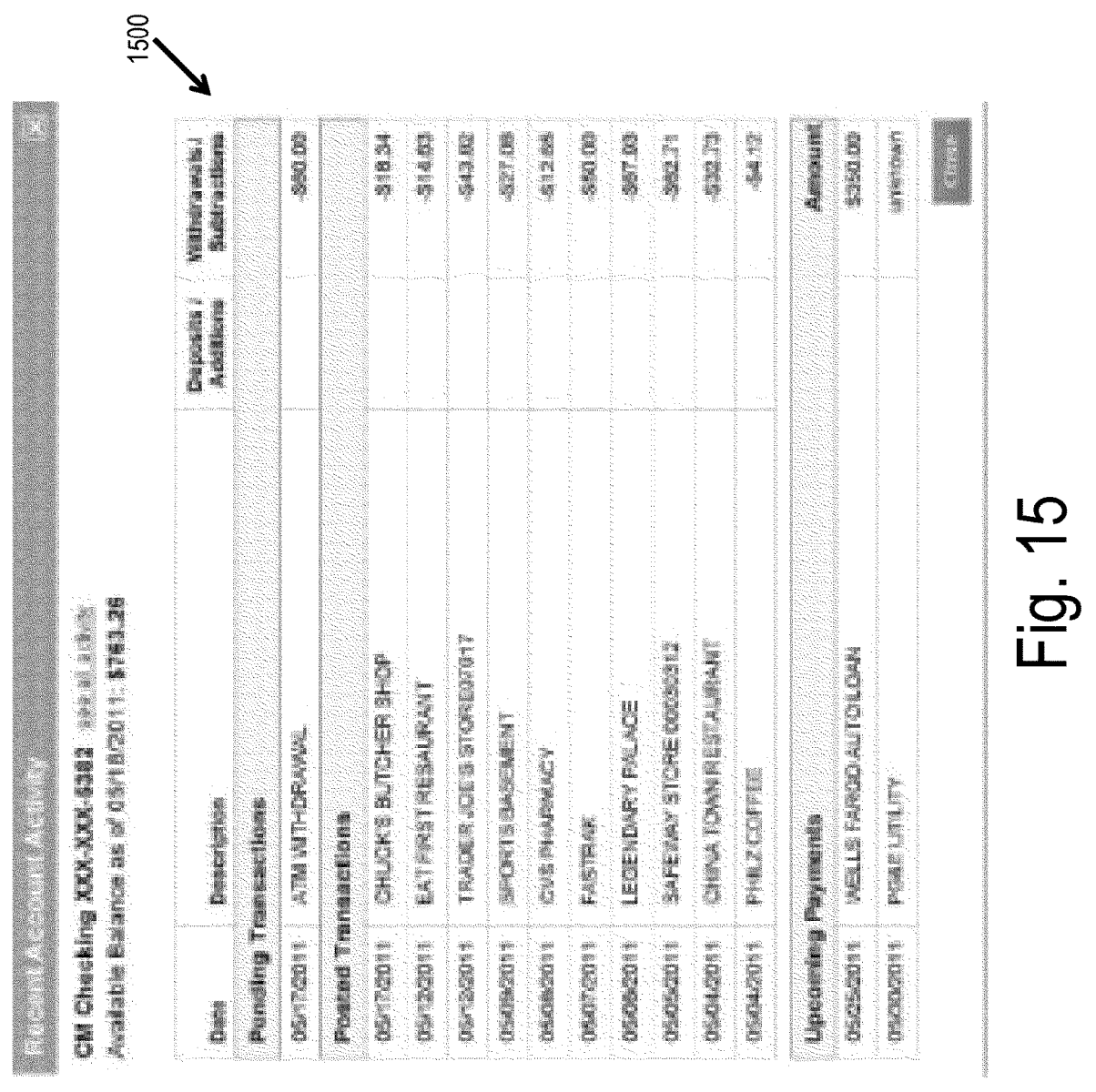

FIG. 15 is an overlay display 1500 that may be provided to an account holder in connection with display 1400 from FIG. 14. When the account holder selects view account details link 1410, an overlay display 1500 may be generated over the display 1500 in FIG. 14. Retrieving account information regarding the account that was selected in menu 1408 may populate the information in the overlay display 1500. The overlay display shows the upcoming payments and the posted transactions and the pending transactions so that the account holder may be able to determine the amount that is available to pay the adverse account. After the account holder reviews the account details and selects the close button, the overlay is removed and the screen 1400 is displayed for the account holder to complete the remediation process 1300.

Figure 16:
FIG. 16 shows a screen display that shows a payment confirmation page when the account holder has selected the pay now button in FIG. 14.

FIG. 16 shows a screen display 1600 that shows a payment confirmation page when the user selected the pay now button 1416 in FIG. 14. FIG. 16 illustrates other options that may be provided to the account holder to avoid being late again. As shown in FIG. 16, the user may choose to receive free alerts for low account balance, nearing the credit limit, or paying the unpaid bills coming due. In other embodiments, the user may choose to schedule a recurring payment for the account that had an adverse account status as shown in display 1600.

Figure 17:
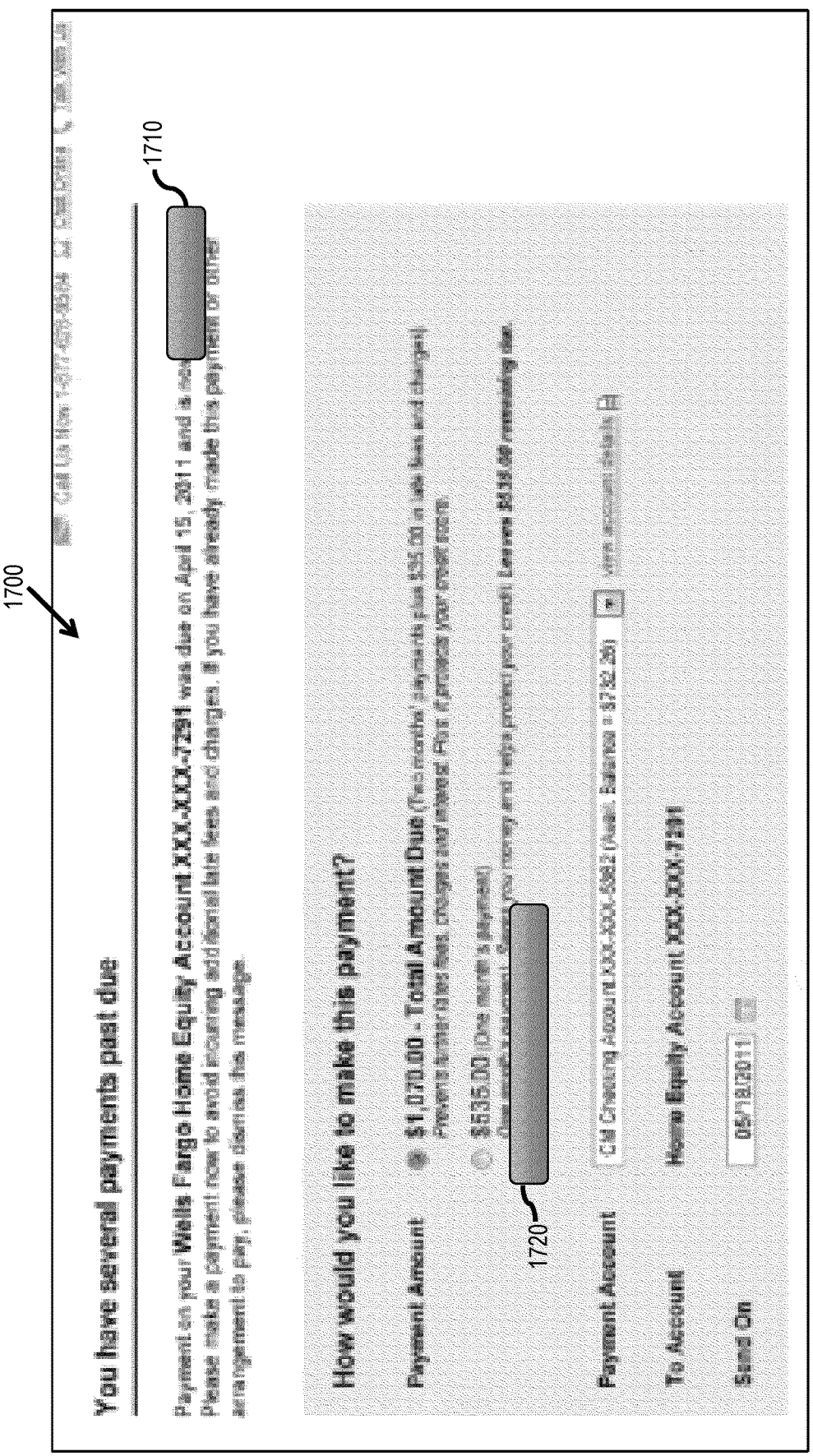
FIG. 17 is a screen display that may be provided to an account holder in connection with an account that is in delinquent status.

FIG. 17 is screen display 1700 that may be provided to an account holder in connection with an account that is in delinquent status (e.g. more than one month) but not severely delinquent (e.g. more than two months). In screen display 1700, the account holder is informed that the account holder is late by a number of days 1710 (e.g. 33 days late). The account holder is provided the option to choose between two payment amounts because the account holder owes two monthly payments on the home equity line of credit. The account holder may choose to make a partial payment. In other embodiments, the user may select the view more payment options link 1720. In some embodiments, the virtual collection agent logic 147 may generate additional payment options when the user selects payment options link 1720.

FIG. 18 is screen display 1800 that may be provided to an account holder when the account holder selects the view more payment options link from FIG. 17. In some embodiments, screen display 1800 may be generated as an overlay over display screen 1700. The screen display 1800 may provide the account holder with one or more other options. In some embodiments, a first option 1810 and second option 1820 which the user may select instead of the options that the originally presented on screen display 1700.

Figure 19:
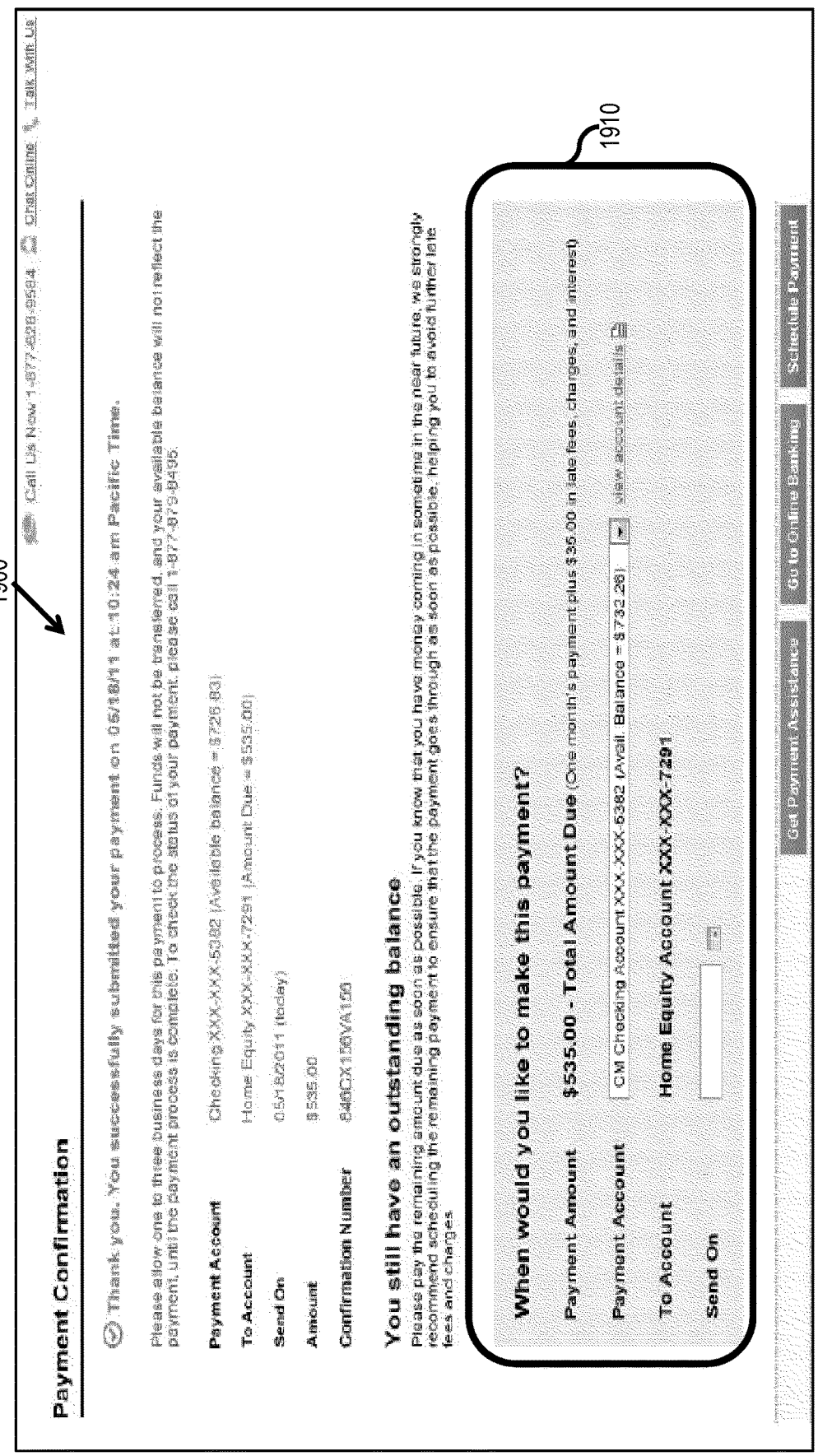
FIG. 19 is a screen display that may be provided to an account holder when the account holder has made a partial payment for a past due account.

FIG. 19 is screen display 1900 that may be provided to an account holder when the account holder has made a partial payment for a delinquent account. After receiving a partial payment, the collection portal logic 140 may generate a screen display 1900 that confirms that the partial payment has been received. Besides the partial payment confirmation, the screen display 1900 may schedule the remainder of the partial payment. The screen display 1900 may include a screen display 1910 that requests that the account holder schedule a payment that equals the remainder of the payment amount for a future date that is prior to the next due date for the account that has an adverse account status. The account holder has the option to also get payment assistance or go to online banking.

Figure 20:
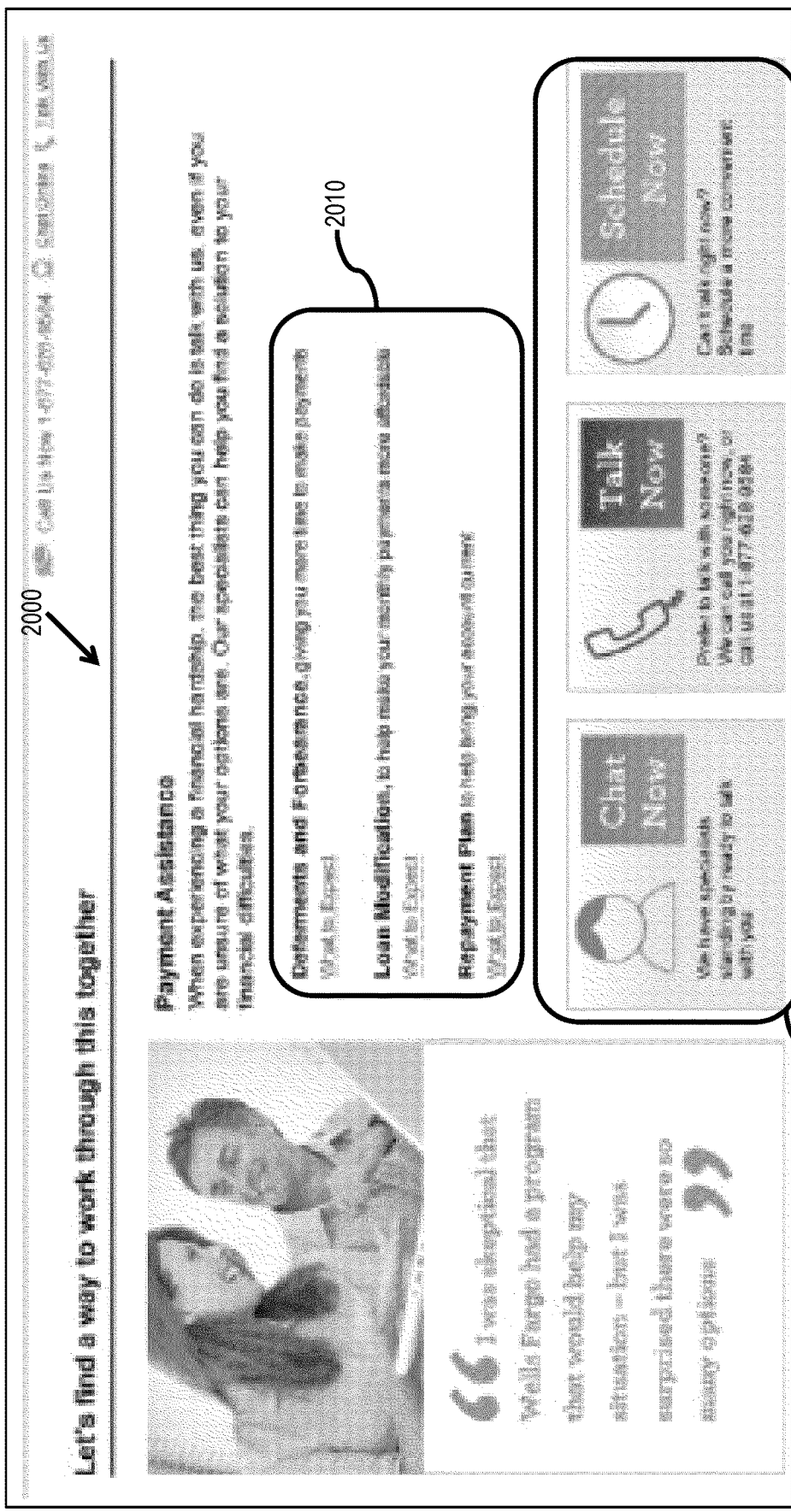
FIG. 20 is a screen display that may be provided to an account holder when the account is seriously delinquent (e.g. more than a predetermined number of pay periods behind).

FIG. 20 is screen display 2000 that may be provided to an account holder when the user account is seriously delinquent (i.e. more than a predetermined number of pay periods behind). In situations of serious delinquency, the screen display 2000 may provide the user with a plurality of options as shown in screen potions 2010 and 2020. In screen portion 2010, the user may be provided with the options to defer or forbear the debt. Also in screen portion 2010, the account holder may be provided with the option to modify the loan or change the repayment plan. Each of the above options may be available based on the type of loan. For example, forbearance and/or deferment may be available for student loans, however, the options 2010 may not be available for mortgage loans. In other embodiments, the account holder may wish to chat, talk or schedule with a debt specialist, as shown in screen portion 2020.

Figure 21:
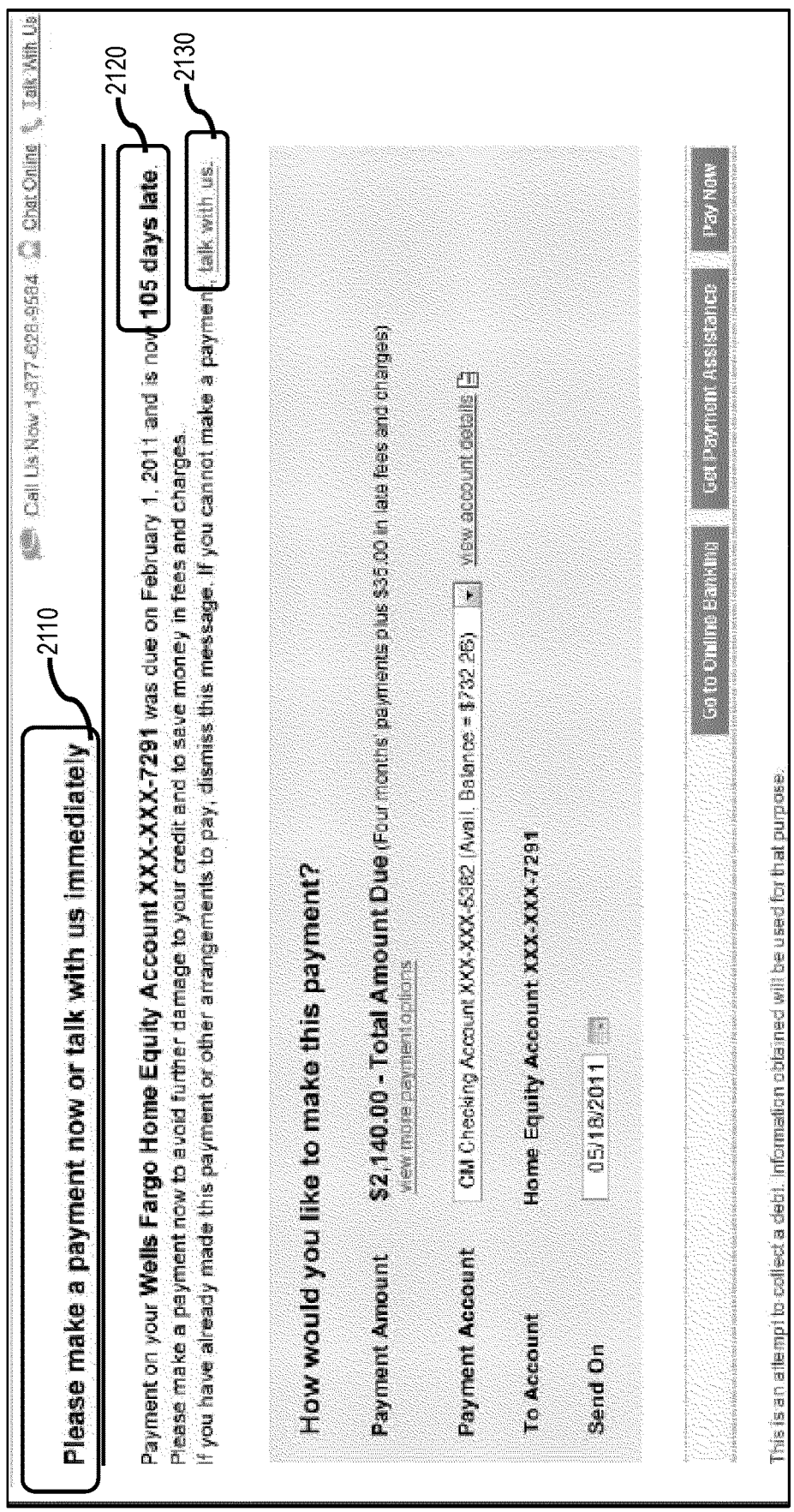
FIG. 21 is a screen display that may be provided to an account holder with an account that is more than 90 days late.

FIG. 21 is screen display 2100 that may be provided to an account holder with an account that is more than 90 days late. In this embodiment, the account holder is informed that the account holder is delinquent by 105 days in message 2120. The message 2110 recites, "Please make a payment now or talk with us immediately." The severity of the message to the account holder increases as the number of delinquent days rises. In other embodiments, the account holder is provided with the option to talk to the creditor in message 2130.

Figure 22:
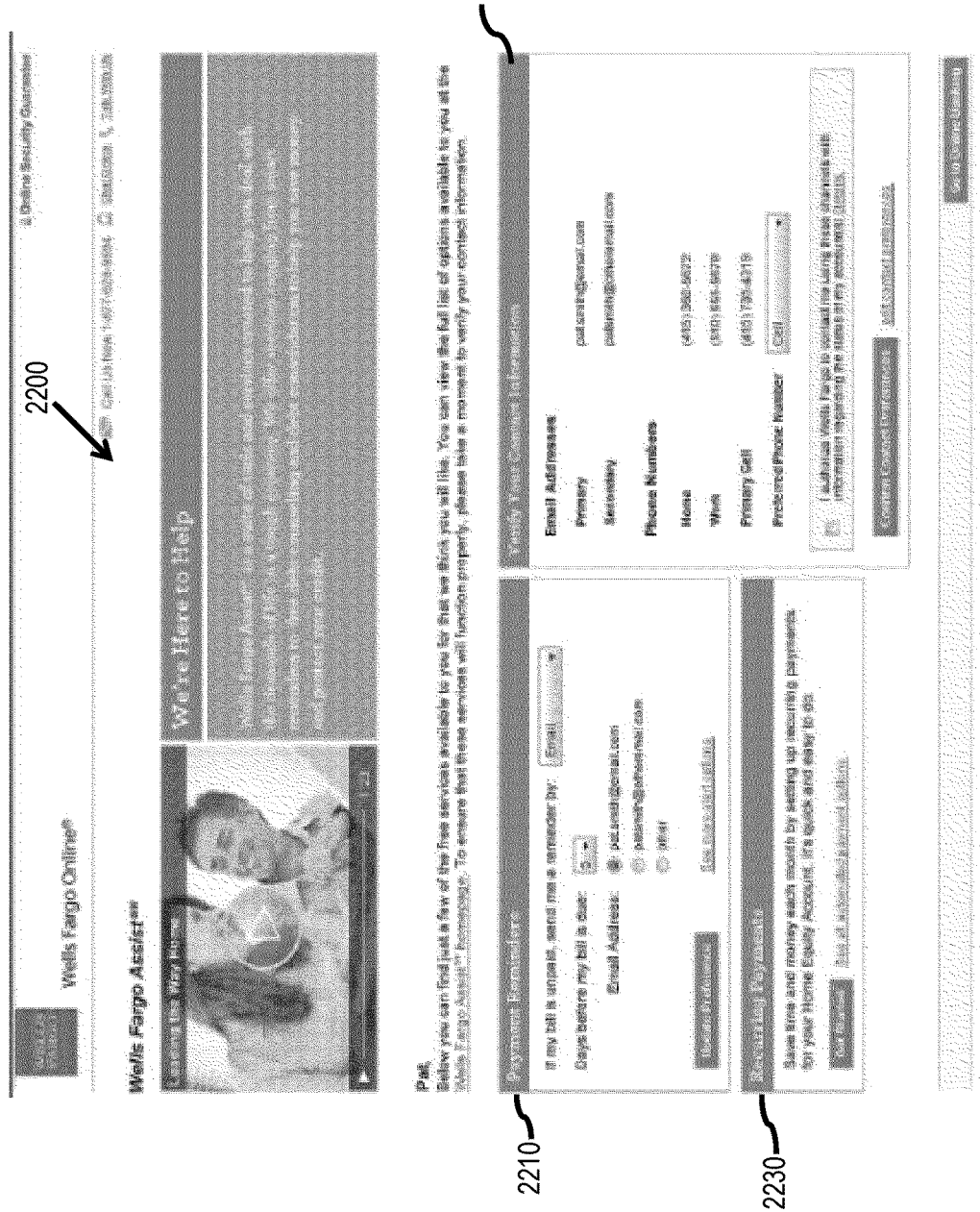
FIG. 22 is a screen display that may be displayed when the account holder requests assistance.

FIG. 22 is screen display 2200 that may be displayed when the account holder requests assistance. Screen display 2200 includes payment reminders 2210, verify contact information 2220, and recurring payments 2230. The payment reminders 2210 may allow an account holder to select one or more e-mail addresses that may receive reminders from the creditor's financial institution. The payment reminders 2210 may allow the account holder to select the number of days before the bill is due to receive an e-mail reminder. Having the verified contact information from the account holder allows the provider of the account to use various contacting channels (e.g. cell phone, texts (SMS), e-mail, home phone) to contact the account holder. The account holder is only contacted with the account holder's consent. The account holder may be provided with the option to set up recurring payments 2230 for accounts that are held by the account holder.

Figure 23:
FIGS. 23 is a screen display that includes a persistent message that is displayed when an account holder has a past due account.

FIG. 23 is screen display 2300 that includes a persistent message 2310 that is displayed when the account holder has a past due account and the user chooses to go to online banking in FIG. 14. In some embodiments, screen display 2300 may be displayed on a computer screen, laptop screen, tablet screen or the like.

Figure 24:
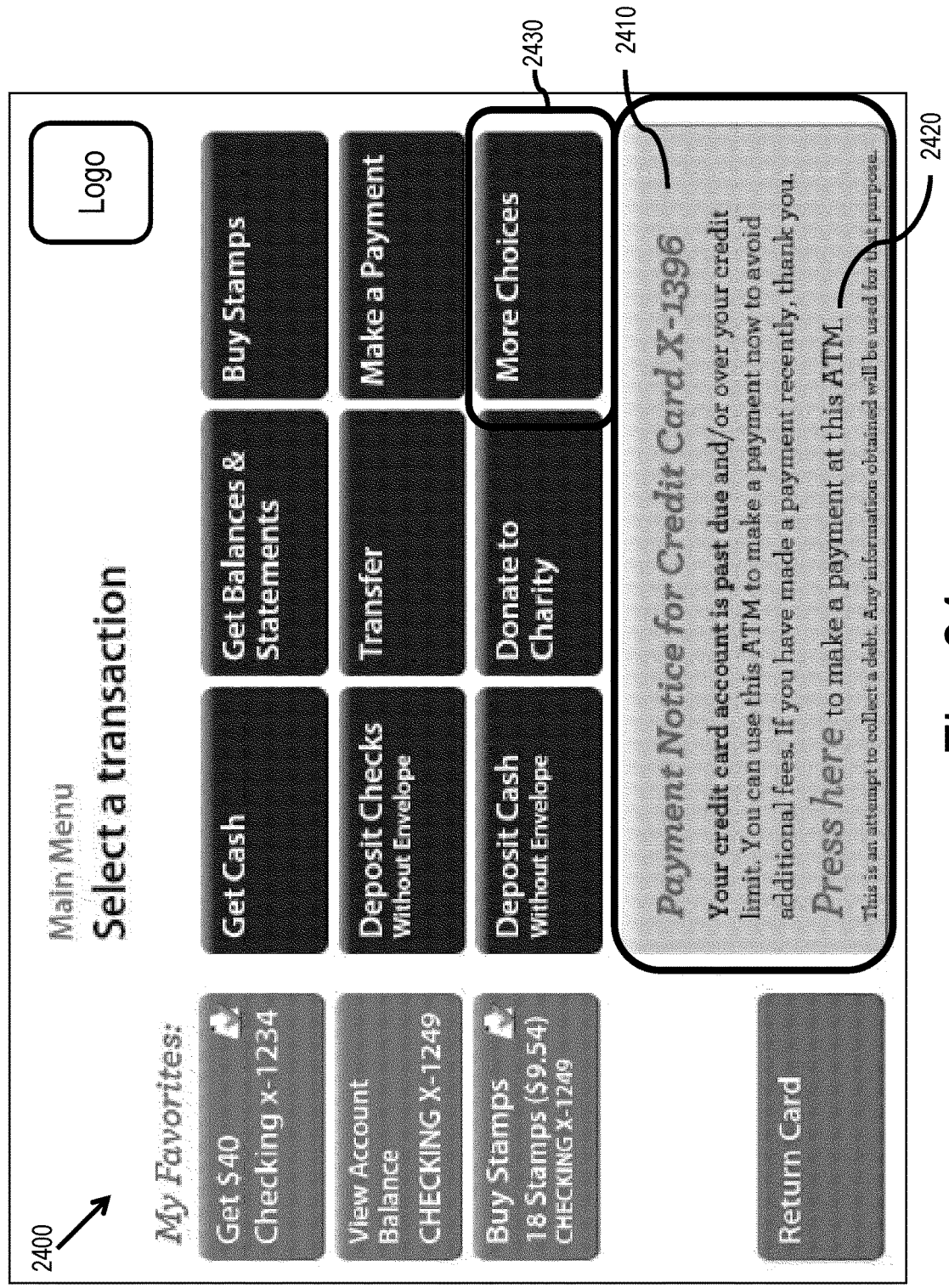
FIG. 24 is a screen display that may be displayed for a user of an ATM with a past due account.

FIG. 24 is screen display 2400 that may be displayed for a user of an ATM upon receiving the pin code for the screen display 2400. When the account holder has a past due account, the ATM may display a message 2410 and message 2420 that allows the account holder pay the past due amount. In particular, message 2410 informs the account holder that an account that is held by the account holder has an adverse account status. Message 2420 provides a selectable link so that the account holder may remediate the adverse account status. The message 2420 is an attempt to collect a debt and the information will be used for the collection of the debt. Accordingly, an ATM may be used remediate the adverse account status. In various embodiments, more choices 2430 may be selected by the account holder to remediate the adverse account status.

Figure 25:
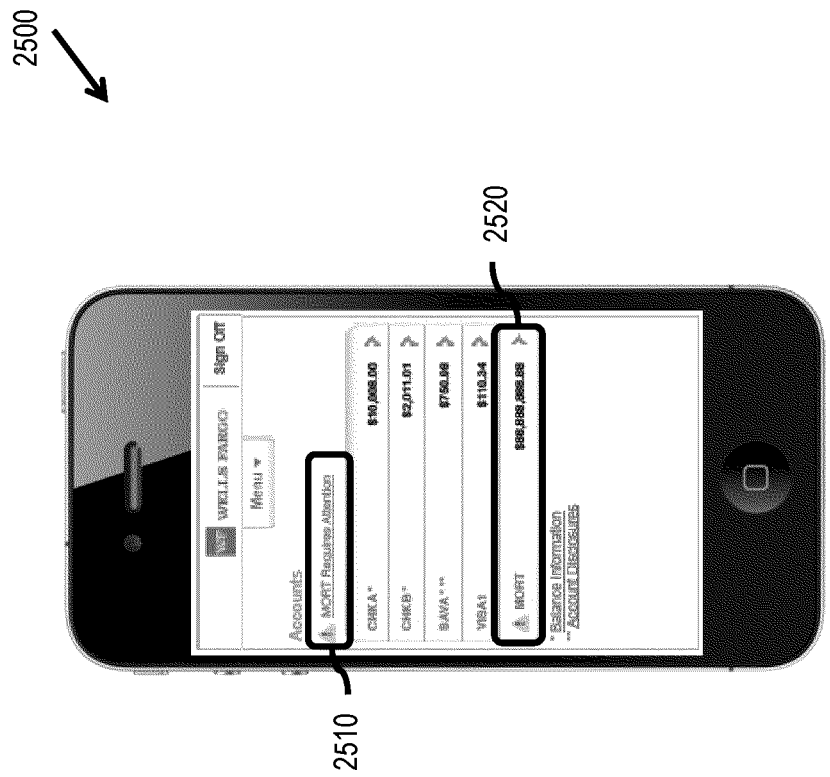
FIG. 25 is a screen display that may be generated by a mobile device for an account holder with a delinquent account.

FIG. 25 is screen display 2500 that may be generated by a mobile device. When the account holder has a mortgage that is past due a persistent message 2510 may be displayed to indicate to the account holder that the mortgage is past due. As shown in message 2520, the account that is past due is also highlighted for the user. The account that is past due remains highlighted throughout the entire mobile banking session.

In other embodiments, when there are a plurality of accounts for a single account holder that have an adverse account status, the collection portal logic 140 may determine which debt to collect first. In some embodiments, the collection logic 140 may attempt to collect the smallest debt first. In other embodiments, the collection logic 140 may attempt to collect the largest debt first. Yet in other embodiments, the collection logic 140 may determine which debt to collect based on the total amount of funds that are available in the account holders other accounts. In particular, the collection logic 140 may determine the debt to be collected based on an aggregation of the account balances of all the account holder accounts. For example, when the account holder as $1000 in an account, all debts that are larger than $1000 will not be collected, but all debts that are less than $1000 may be collected. In other embodiments, certain types of adverse account status may be remediated using certain channels only and the account holder may not be subjected to the same message repeatedly. For example, the same adverse account may not be remediated more than twice in a single day or a predetermined time period. The system shown in FIG. 1 may also be configured to gather collection data regarding collection channel account holder behavior. For example, an account holder may remediate debts of lower dollar amount via a mobile device while larger dollar amounts may be remediated by another channel. Knowing the above information regarding the account holder allows the collection portion logic to customize the collection based on the account holder's previous collection behaviors. The collection portal logic 140 may analyze multiple adverse accounts that are delinquent and the system may remediate the adverse account that is considered the highest risk. Risk may be determined based on the severity of the delinquency or based on the amount of funds involved or whether the debt is a secured or unsecured debt.

Although an example page flow is described above, it will be appreciated that this page flow is merely one example. For example, although the page flow is described as being dynamically customized based on the risk assessment provided by the risk assessment logic 141, it will be appreciated that the page flow may also be dynamically customized based on other factors in addition to the risk assessment. For example, the page flow may be dynamically customized based on other customer profile information that is unrelated to the risk assessment. Likewise, the links that are provided on each page may also be dynamically customized based on such other customer profile information. Additionally, while certain pages are shown in the Figures, it will be appreciated that the Figures are not intended be comprehensive, and various other and/or different pages may also be presented to the account holder.

Figure 26:
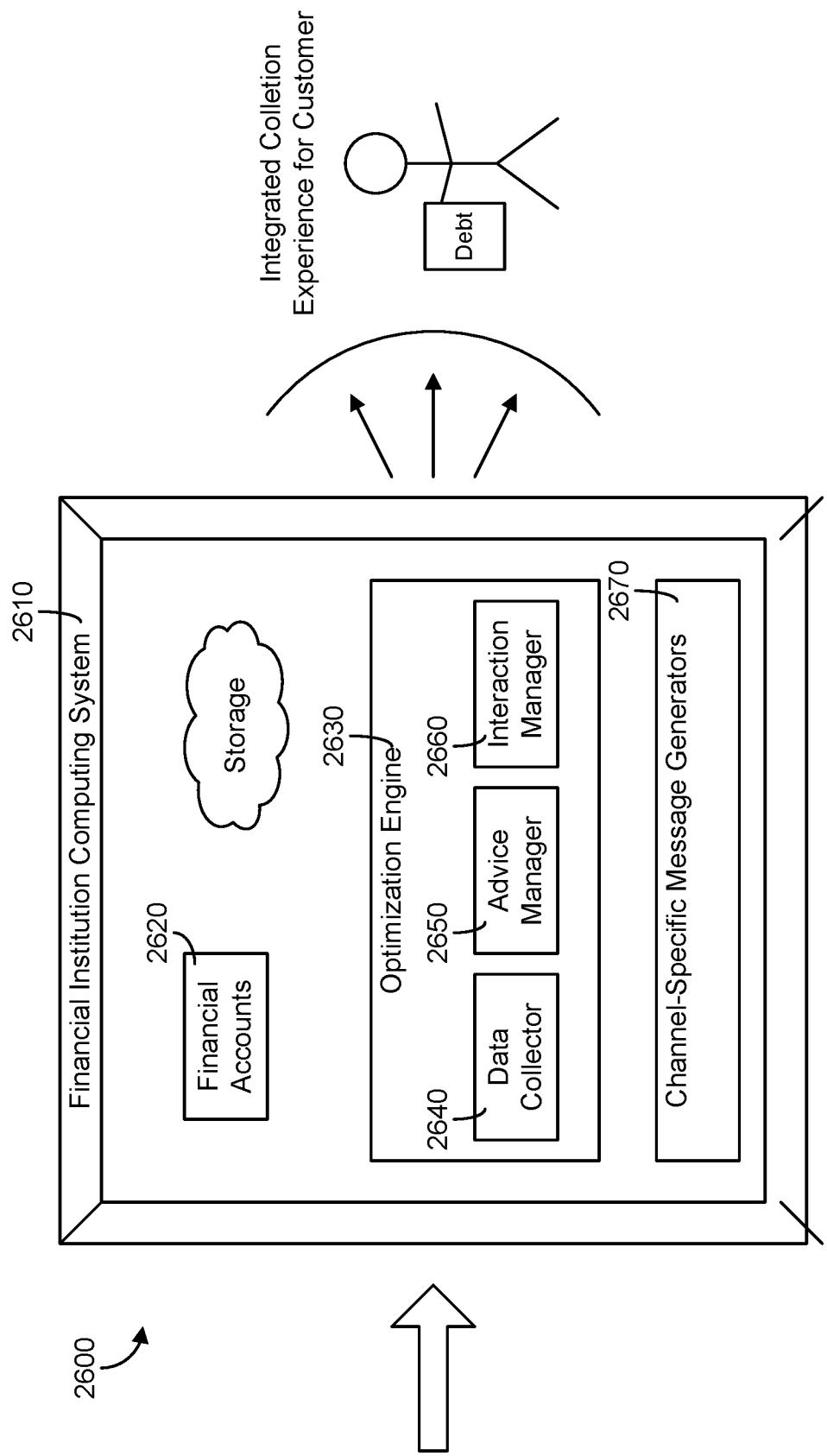
FIG. 26 is a schematic diagram of a financial institution computing system according to an example embodiment.

FIG. 26 is a schematic diagram of a financial institution computing system 2610 according to an example embodiment. Financial institutions may include any establishment whose business includes a focus on financial transactions, such as crediting, debiting, funds transfer, investments, loans, deposits, exchanging currency, etc. Financial institutions may include organizations such as banks, trust companies, insurance companies, investment dealers, title loan companies, etc. Financial institution computing system 2610 may include financial accounts module 2620, optimization engine 2630, data collector 2640, advisor manager 2650, interaction manager 2660, and storage. Financial accounts module 2620 may be configured to manage the logistics and operations of the financial accounts held at the financial institution that operates the computing system 2610. Financial accounts module 2620 may allow financial accounts to be opened or closed, may facilitate transactions within and between financial accounts, may compute and display statistical and informational data regarding individual financial accounts or a section or subsection of financial accounts within a financial institution, etc. Financial accounts module 2620 may also compute and allow statistical and informational data regarding all financial accounts within a financial institution to be displayed and analyzed as a whole. According to one embodiment, financial accounts module 2620 may retrieve information from and send information to data collector 2640, advisor manager 2650, interaction manager 2660, and/or storage.

Financial institution computing system 2610 also includes an optimization engine 2630, which receives and analyzes information relating to a customer's debt, risk, and/or account status to develop and output an integrated collection plan. The collection plan, also referred to as an individual customer action plan, may include a suggestion of subsequent outreach steps, prevention steps, or channel interaction suggestions to initiate a collection process, carry out a collection process, or prevent an account from falling within a collections process. The optimization engine 2630 may be used to optimize interaction through channels for collection messaging, including determining cost effective channels during various collection stages (e.g. early, late, urgent) that will elicit a response from a customer. Resulting from the optimization engine 2630 is an integrated, consistent collection experience for a customer. Such an experience may allow a customer to feel that collection actions taken by a financial institution are consistent, thoughtful, purposeful, and harmonious, thus resulting in better service to the customer.

Referring still to FIG. 26, the data collector 2640 collects data from several sources that may be used in creating a collection plan for a customer. The data collector 2640 may collect data from sources including financial accounts module 2620, the stock market, a news source, daily interest rates, outside collection entities, actuarial tables, etc.

The advisor manager 2650 manages functions performed by the optimization engine 2630 to create a collection plan for a particular customer by accessing and analyzing information in a customer profile 2920. The advisor manager 2650 may use information from a variety of sources, including the customer profile 2920, information collected from the data collector 2640, information in the financial accounts 2620 and storage, etc., to develop an optimal collection plan.

The interaction manager 2660 may be configured to manage the execution of the collection plan developed in the advisor manager 2650 through specific channels. The interaction manager 2660 may communicate with computing systems, agencies, storage systems or lists that control or support the operation of different interaction channels, sometimes also referred to herein as message delivery channels. For example, where a collection plan may call for reduced phone calls and written letters, the interaction manager may update call lists and computing systems responsible for implementing the calls and letter production.

The financial account module 2620, optimization engine 2630, data collector 2640, advisor manager 2650 and interaction manager 2660, may each comprise logic or code disposed within memory and executable by a processor to perform the functions and duties described throughout the disclosure. The systems may be described throughout the disclosure as performing a number of duties and functions in a particular order. A person having ordinary skill in the art can appreciate that simple reordering or sequencing of functions and duties may result in the same outcome. The description is not intended to limit the arrangement of execution of the duties.

Computing system 2610 may further comprise a plurality of channel-specific message generators 2670. The message generators 2670 may be configured to generate remdiation messages for different channels to be delivered to the account holder responsive to information received from the optimization engine 2630. For example, the message generators 2670 may include an email generator configured to generate and send remediation messages via email. As another example, the message generators 2670 may include an ATM message generator configured to generate and send remediation messages for display to a customer at an ATM. The message generators 2670 may further include additional generators configured to generate and send remediation messages in connection with each of the channels shown, e.g., in FIG. 30.

Figure 27:
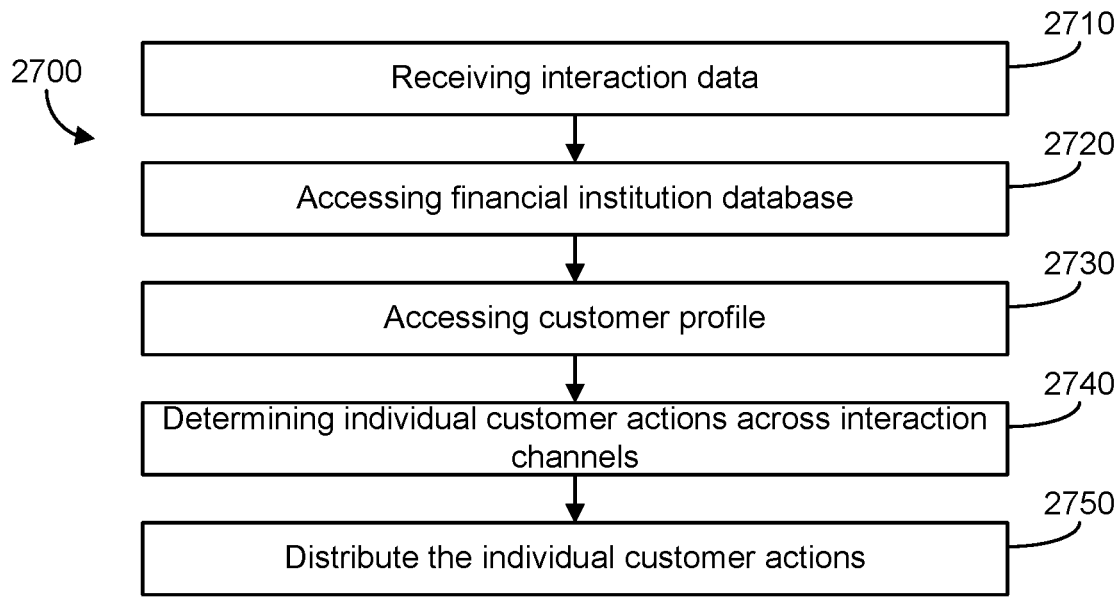
FIG. 27 is a flow diagram of a method performed by an optimization engine according to an example embodiment.

FIG. 27 is a flow diagram showing an overall collection process performed by optimization engine 2630 according to an example embodiment. The collection process 2700 may be performed by the optimization engine 2630. The process may involve receiving interaction data relating to a customer (2710). Interaction data may include any data resulting from interaction with a customer through any channel or avenue of communication. Such channels may include email, SMS text message, ATM interactions, telephone interactions, online survey or website portal interactions, etc. For example, the interaction data may include a promise to pay by a customer, a past attempt to reach a customer, a customer's reaction or response to attempts to communicate or collect information, a set of customer preference regarding how the financial institution computing system 2610 communicates with the customer, etc. The interaction data may also be received from another source instead of the customer directly. For example, a telephone call to a customer's residence may result in connecting with a family member or housing mate of the customer, wherein the family member or housing mate may provide information relating to a customer that may be useful in the collection effort. For example, a family member or roommate may offer information that the customer is ill, out of the country, no longer living at the provided residence address, has passed away, etc.

The process may also involve accessing the financial institution database or storage (2720). The financial institution database may store data and information relating to the financial accounts held by a customer within the financial institution or information relating to customer profiles. Such data may derive from sources internal or external to the financial institution computing system 2610, for example, data regarding balance trends, net worth, equity ratios, late payments, past collections histories or the like.

The optimization engine 2630 may be configured to access a customer profile 2920 (2730). The customer profile 2920 may be used to store specific information regarding customers and facilitate the creation of an individual collection plan for a customer according to the contents of the customer profile 2920. The optimization engine 2630, the data collector 2640, the advisor manager 2650, the interaction manager 2660, and the financial accounts module 2620 may be configured to access the customer profile 2920.

Figure 27A:
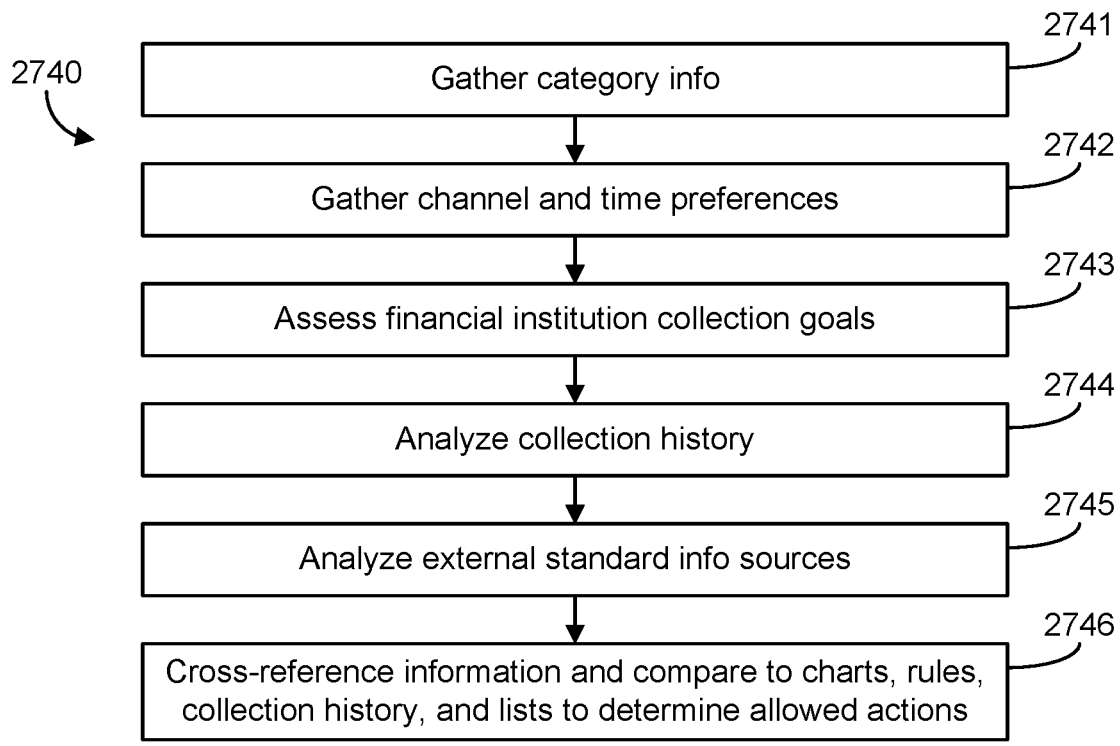
FIG. 27A is a flow diagram of a process of determining individual customer action according to an example embodiment.

Referring still to FIG. 27, the optimization engine 2630 may be configured to determine individual customer actions across interaction channels (2740). Individual customer actions may include previous actions taken by the financial institution along with responses to those interactions. For example, a previous call with a customer may be noted along with the content of the call as a previous interaction through a telephonic channel. An acceptance and read receipt from an email or a text may be another interaction, wherein the system may note that the customer was notified through the electronic channel at a particular date and time. Based on this information, the optimization engine 2630 determines a collection plan that includes actions to be performed with respect to the customer. The collection plan may implement an integrated, continuous messaging and collection campaign to provide the customer with a meaningful experience. The optimization engine 2630 may be configured to make this determination automatically, periodically, or upon manual selection and command through a user interface. FIG. 27A below further explains the process implemented by the optimization engine 2630 to determine individual customer actions across interaction channels in greater detail.

At step 2750, the system may be configured to distribute the individual customer actions determined at step 2740. The individual customer actions may be distributed to the advisor manager 2650, the data collector 2640, the customer profile 2920, or the interaction manager 2660. The customer profile 2920 may store the individual customer actions or have a module that can display a plurality of suggested actions. The interaction manager 2660 may oversee implementation of the actions. Further detail regarding individual customer actions may be found below, including in FIGS. 27A and 28. The individual customer actions may be viewable on a display.

FIG. 27A is a flow diagram showing step 2740 of FIG. 27 in greater detail. Specifically, FIG. 27A shows a process of performed by the optimization engine 2630 to determine actions to be performed with respect to a customer. The process may include gathering category information (2741). Category information may include information relating to categorized segments in which a customer may fall based on a variety of factors. For example, category segments into which a customer may fall include lax payer, financially distressed, strict payer, recently bankrupt, etc. These category segments may depend upon any number of features, such as the amount of funds a customer has in the customer's financial accounts, the customer's payment history, a customer's default history, outstanding debt, etc. Category information may be received from the financial accounts module 2620, data collector 2640, storage within the financial institution computing system 2610, and/or an outside source configured to securely communicate with sections of the financial institution computing system 2610.

The process of determining individual customer action may also include gathering channel and time preference information (2742). The channel and time preference information may be gathered from the financial accounts module 2620, data collector 2640, storage within the financial institution computing system 2610, and/or an outside source configured to securely communicate with sections of the financial institution computing system 2610. The time and channel preferences may be gathered from a customer directly through channels or indirectly from related sources and may serve to aid the optimization engine 2630 system or advisor manager 2650 in receiving the customer's preferences to determine the best individual customer action. Time and channel preferences describe the method and frequency in which a customer would like to be contacted. Several components (e.g., the interaction manager 2660, data collector 2640, advisor manager 2650, etc.) may interact with a variety of channels to receive the time and channel preferences directly or indirectly. For example, a preference may be received directly from the customer through an online survey indicating that the customer only wishes to be contacted during the evenings on the customer's home phone. Customer preferences may also be deduced based on a customer's interaction between different channels. For example, if past behavior of a customer reveals that the customer responds to email, texts, or regularly check their online digital account yet the customer is non-responsive to non-digital forms of communication (i.e., letter campaign, phone calls, etc.), then the system may conclude that the customer prefers the specific digital channels used. Similarly, if the system registers no activity through digital channels such as online banking or texts, the system may set customer preferences for non-digital channels. Also, if a customer is observed as regularly logging into the banking website or calling the bank at certain times of the day, then the customer's time preference may be deduced from those behavioral observations.

According to some embodiments, determining individual customer action may also include assessing collection goals of the financial institution (2743). The collection goals prioritize the customer's debt according to collection strategies and needs unique to a specific financial institution and/or the customer. For example, a financial institution offering several lines of credit to customers may prioritize collecting a particular type of debt for a specific reason generally (e.g., credit card debt prioritized over home loans). With respect to an individual customer partaking in several lines of credit, the financial institution may prioritize collecting one debt over the other (e.g., collecting home loan debt over educational loans or credit card debt). The collection goals of a financial institution may be important to consider so that the collection effort directed toward the customer will be consistent, purposeful, and relevant.

Determining an individual customer action may involve analyzing the collection history relating to a customer (2744). The collection history may include an account of all previous interaction with the customer through all channels or mechanisms as related to the collection efforts. The interactions may include a status message alerting the customer of the debt as the customer logged into an account on a specific day. Another interaction may involve reminding a customer about a debt when a customer calls the financial institution to discuss a matter that may involve an issue separate from the debt collection. A letter sent to the customer's residential address may also comprise an interaction. The collection history may catalogue the time and date of the interaction, length of the interaction, channel of the interaction (e.g., phone, brick and mortar, email), customer result from the interaction (e.g., a promise to pay, payment remittance, hostility, etc.) etc. The collection history may be imported into the customer profile 2920.

In one example embodiment, the process of determining an individual customer action may include analyzing external standard information sources (2745). External standard information sources may include information that may not necessarily be unique to a particular customer but may be relevant to a customer. This information may include laws, rules, stock market reports, agency reports, financial institution rules, policies, and procedures, local, national, and international news sources, etc.

The process may involve cross-referencing information and comparing charts, rules, collection history, and lists to determine preferred individual collection actions (2746). The process may compare charts, rules, and collection history with other information accessed and analyzed in the information above to determine a plurality of individual collection actions to take for a customer. The individual collection actions that may result from cross-referencing information and comparing charts, rules, and collection history relating to a customer may describe preferred collection actions a financial institution may take to communicate with a customer regarding collections. These actions may include restricting or permitting communication in a plurality of channels, making an offer to the customer, etc.

Figure 28:
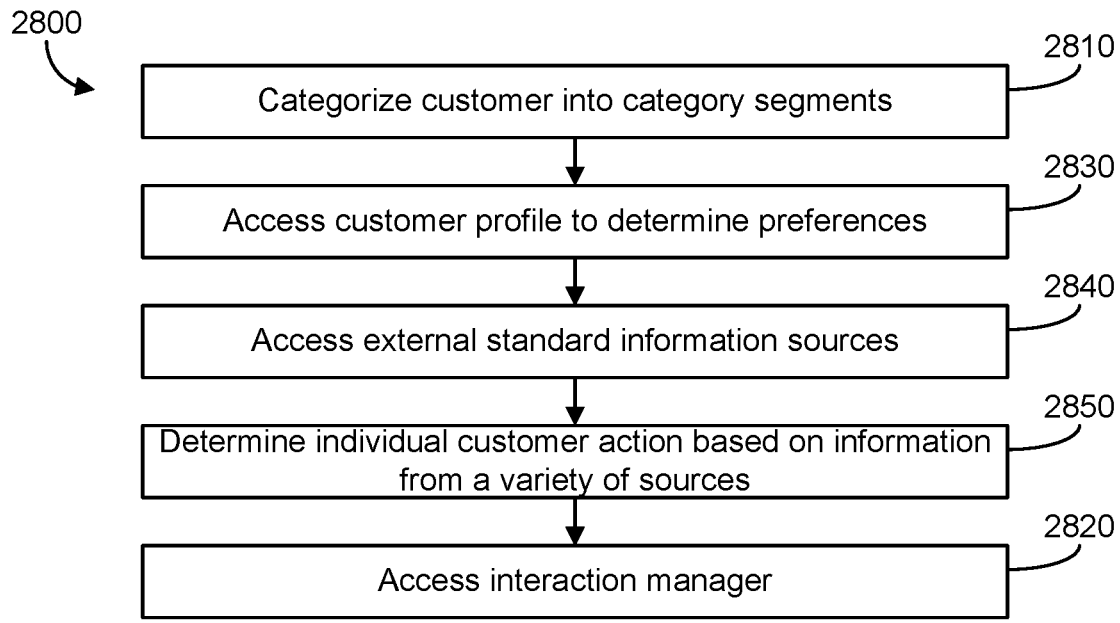
FIG. 28 is a flow diagram of an advisor manager decision making process according to an example embodiment.
Figure 28A:
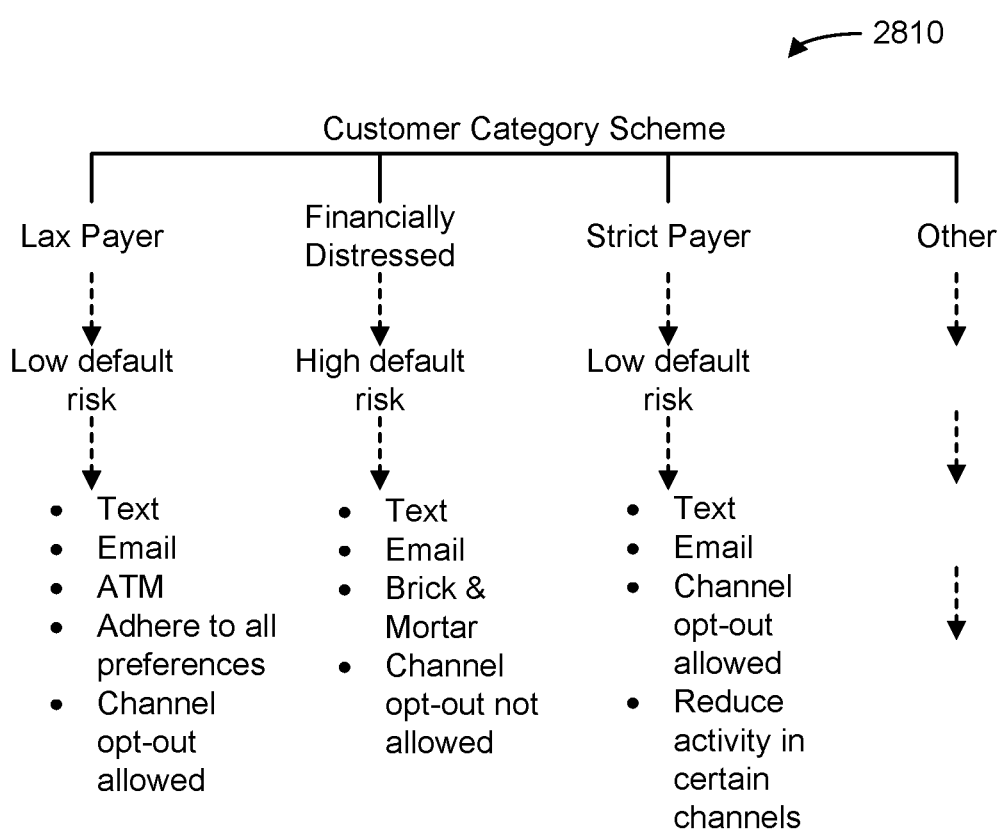
FIG. 28A is a flow chart of a customer category scheme of the process of FIG. 28 according to an example embodiment.

FIG. 28 is a flow diagram of an advice manager decision making process 2800 according to an example embodiment. The advice manager may categorize a customer into segments (2810). This categorization process may involve assigning customers to segments, calculating or assigning risks according to the segmentation, and assigning allowable actions (or restricting actions) based on the category and risk. The customer category scheme is depicted in FIG. 28A and described in greater detail below.

The advisor manager decision making process 2800 may involve the advisor manager 2650 accessing the customer profile 2920 to determine customer preferences (2820). The customer profile 2920 may maintain a customer's preference regarding the details of how a financial institution communicates with the customer, including time, interaction channel, frequency, content of message, etc. For example, the customer may appreciate the financial institution letting the customer know a significant amount of detail about the customer's debt or late payment. Another customer, for example, may only desire a short reminder and an easy method to remit payment. The customer profile 2920 may also maintain information regarding related financial accounts shared with other customers at the financial institution (e.g., a parent may have a co-account with a child or spouse). The advisor manager 2650 may include financial information relating to financial accounts in which the customer share or is included as an account holder or beneficiary.

According to one embodiment, the process 2800 may access external standard information sources to develop a decision (2830). The process 2800 may access similar external standard information sources described above in step (2745) of the process of determining an individual customer action by the optimization engine 2630. The external standard information sources may include general yet relevant information regarding a customer. These sources may include laws, rules, stock market reports, legal agency reports, financial agency reports, financial institution rules, policies, and procedures, local, national, and international news sources, etc. The process may access external standard information that contains data from credit agencies, licensing agencies, government agencies, and other institutions. For example, such data may include the credit score of the customer as provided by a plurality of credit reporting agencies, auditing or board licensing information if the customer is or owns a business, business ratings, etc. Such data from external sources 160 may also include economic information relating to the customer's profession including economic trends, job stability, and market demands.

The process may determine individual customer actions based on information from sources described above, including information from the customer profile 2920, financial accounts, external standard information sources, data collector 2640, etc. (2840). The individual customer actions include available collection outreach options for a customer based on the sources above.

The interaction manager 2660 may receive (2850) information from the advisor manager 2650 to execute an individual customer action plan developed through the process above. For example, the interaction manager 2660 may remove the customer's number from call lists if an individual customer plan states that the customer should no longer receive calls, or the interaction manager 2660 may send a message to the server to update call lists for agents. The interaction manager 2660 may be accessed automatically after the advisor manager 2650 creates the customer action plan or the interaction manager 2660 may execute upon a manual command, such as by engaging, clicking, or initiating an icon or hyperlink on a user interface.

FIG. 28A is a flow chart of one example of the customer category scheme of the advice manager decision making process 2800. The customer category scheme in step 2810 may have categories with several segments of customers. For example, the segments may include a lax payer, financially distressed customers, strict payers, previously bankrupt payers, etc. A customer may be categorized as a lax payer if the customer occasionally fails to meet the approved deadline for payments yet, according to financial accounts owned by the customer, the customer is financially capable of paying the debt. For example, a customer may have a high balance in one or several of the customer's accounts and yet the customer may periodically remit payment days or weeks after a given deadline. A customer may be categorized as financially distressed if the customer has a low balance in the customer's financial accounts, and/or a high amount of debt or repayment obligation, etc. A customer may be categorized as a strict payer if the customer routinely makes payments on debt or obligations before the specific deadlines. Strict payers may or may not include financially distressed payers. A customer who is categorized as a strict payer may, for example, may set up payments using automatic deduction systems. A customer's categorization may change, alter, or vary from time to time based on the circumstances a customer encounters. For example, a customer categorized as a lax payer may fall into the segment of a financially distressed customer should that customer lose a lawsuit, lose a family member who serves as the family principle source of income, lose money in the stock market, or have a significant reduction of funds in the customer's account for any number of reasons.

Risk probability levels may be assigned to customers based on the customer's category segment. The risk levels may include low default risk, medium default risk, high default risk, etc. In other embodiments, the risk level may be specified in terms of a score (e.g., 0 to 100) or a decimal value (0.00 to 1.00). The risk levels may be calculated or determined based on the individual customer category and background or the risk levels may be determined based on pre-determined risks for a group of customers as a whole at a financial institution. Other factors may be taken into account to define the risk levels. For example, these factors may include the type of debt a customer has, the ranking of importance of the debt by the financial institution, the likelihood of charge-offs, tax considerations, the amount of time the customer has maintained the debt, the amount of time a customer has been categorized under a specific segment, etc.

Certain actions or rules may be assigned to a particular segment and risk level. These actions may involve restricting interaction channels, allowing channels, etc. For example, FIG. 28A shows a lax payer having a low default risk level may be contacted through interaction channels including text, email, and ATM. A rule may be set that causes the optimization engine 2630 to adhere to the preferences set by a customer. Such preferences are described in greater detail, for example, in the preference chart of FIG. 30. The preferences may further include having a customer or decision maker opt out of interaction channels. A financially distressed segment with an assigned high default risk may allow or require interaction channels through text, email, and brick and mortar locations. The ability to opt-out of certain channels, however, may not be allowed. A strict payer with a low default risk level may be contacted through channels including text and email. Reduction of activity in certain interaction channels and total channel opt-out options may be adhered to. The rules and actions made capable with the system and process described may all be subject to banking industry rules and procedures and particular financial institution missions, procedures, and goals for customer satisfaction.

Figure 29:
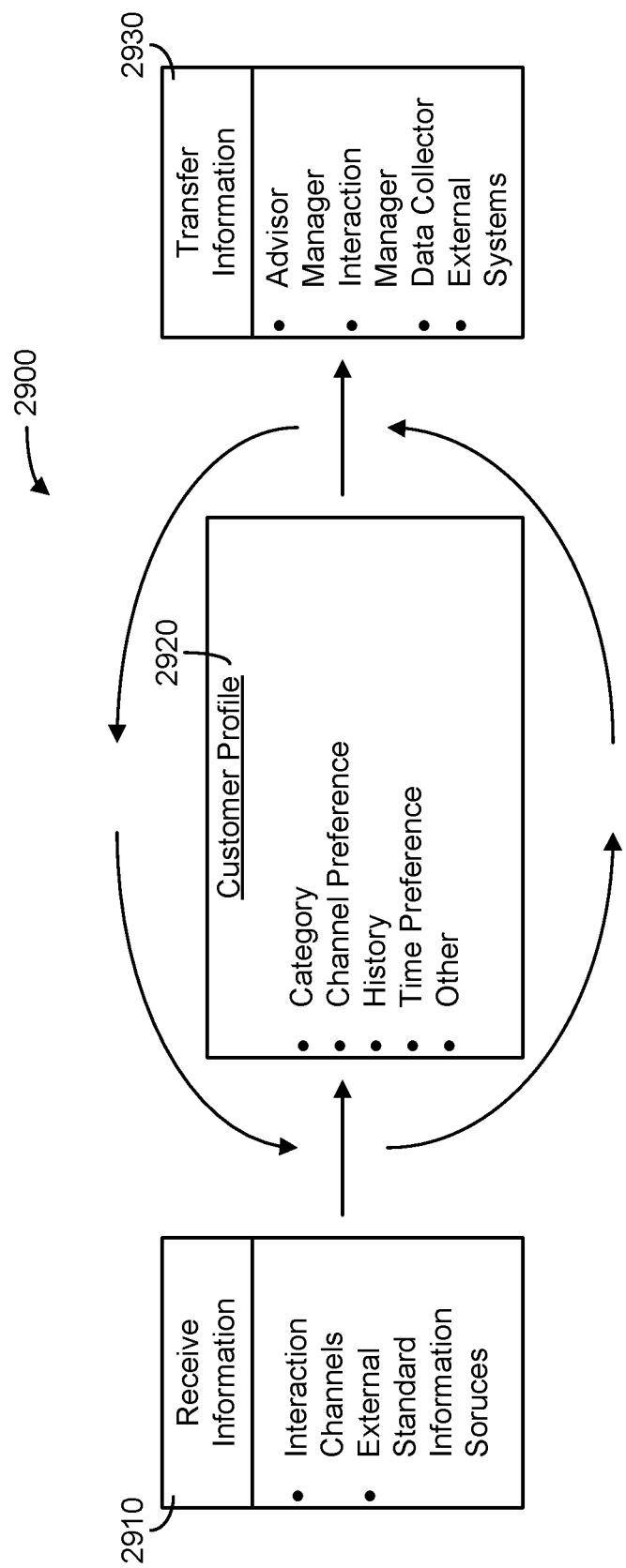
FIG. 29 is a flow chart of a process involving the customer profile according to an example embodiment.

FIG. 29 is a data flow diagram according to an example embodiment. The customer profile 2920 may receive information from a variety of sources (2910). For example, the customer profile 2920 may receive information from interaction channels, financial accounts module 2620, external standard information sources, etc. The information received from these sources may include information specific to an individual customer. In some embodiments, the information may include data, which, although is not specific to the individual customer, is related to the customer.

The customer profile 2920 may specify the category (or category segment) of a customer. The category may be determined based on the customer category scheme of 2810. The customer may be categorized as a lax payer, financially distressed, strict payer, or some other category. A customer's particular category may accompany a risk level and certain actions attributable to the categorization of the customer only. However, those actions may be further restricted in the final individual customer action plan 3210 developed by the optimization engine 2630.

The customer profile 2920 may also include a customer's channel preference. FIG. 30 shows an example of a preference chart that shows a customer's communication preference according to one embodiment. The channel preference may update each time a response from a customer is received. The channel preference's update may be based on behavioral observations or explicit instructions by the customer.

The customer profile 2920 may contain interaction history relating to the customer. This history may include the customer's payment history, default history, contact history, the financial institution's collection history, etc. The contact history may be parsed according to the channels in which a customer has contacted the institution. For example, a contact history may include regarding the time, date, location, and reasons of a customer's contact with the financial institution. Such contact history may reveal that a customer visited a branch to make three deposits, the customer logged onto the online banking site twice in the past two weeks (documenting specific dates and times), and the customer used the texting services provided by the financial institution to check the customer's balance ten times in a month. The financial institution's contact history may reveal that a reminder of the customer's debt was printed on two deposit slips, the customer spoke to a teller or banker regarding the debt during one of the visits to the branch, and the online banking system transferred a flashing splash screen to the customer's interface display during the customer's previous online banking login.

The customer profile may also include time preferences for the customer. The time preference may be particular to the interaction channels. For example a customer may have no time preferences regarding contact by email, but a customer may only wish to be contacted by telephone during the early afternoon on weekdays. The time preferences may be determined based on explicit instructions from the customer or observed behavior of the history of interaction through the channels. This information may be transferred (2930) to other portions within the financial institution computing system 2610 or outside sources including, advisor manager 2650, interaction manager 2660, data collector 2640, external computing systems for creditors or debt collectors, etc.

FIG. 30 is a schematic diagram showing customer preferences that may be tracked according to an example embodiment. Digital channels may include email, online chat, text (short message service-SMS), web-based channels such as online banking portal, and automatic teller machines having a display or capability to transmit digital information and/or print out information on receipt paper, fax, other digital avenues, etc. Non-digital channels may include call center agents, call lists that may be dialed by automatic dialers to call a home line or mobile based phone number, mailing letters, brick and mortar interactions such as at a bank or a home visit, etc. Channel specific times and rules may also be specified. For example, one may have preferences that include contact in certain avenues always, never, periodically, sometimes, once a month, etc. These preferences may include at most and at least operators (e.g., allow contact through a certain channel at most 3 times a week or month, at least once per day, etc.). The preference chart may also include if/then operators. For example, if a customer is contacted by X, then do not contact the customer by Y (e.g., if the customer is contacted by email, then do not contact the customer by online chat). Other rules and preferences may include contacting the customer by a particular channel for urgent matters (e.g., communicate with me regarding collection matters when I enter a brick and mortar location for urgent matters), or whenever the amount owed exceeds a certain amount specified by the customer and/or bank.

The rules and preferences throughout may transfer across digital and non-digital categories as well as the plurality of channels. For example, a preference may suggest the following scenario: if a customer is contacted by text and by call center agents, then do not send the customer a letter. The rules and preferences may also apply according to the amount of money owed or debts. For example, certain rules may apply or be allowed to be selected if the customer has an amount below or above a threshold selected by the financial institution. The rules and information listed in the chart may be transmitted or transcribed in any form for the customer profile 2920.

The embodiments of the present disclosure have been described with reference to drawings. The drawings illustrate certain details of specific embodiments that implement the systems and methods and programs of the present disclosure. However, describing the invention with drawings should not be construed as imposing on the invention any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system.

As noted above, embodiments within the scope of the present disclosure include program products comprising machine-readable media for carrying or having machine-executable instructions or data structures stored thereon. Such machine-readable media may be any available media that may be accessed by a general purpose or special purpose computer or other machine with a processor. By way of example, such machine-readable media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present disclosure have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing computers in the form of computers, including a processing unit, a system memory or database, and a system bus that couples various system components including the system memory to the processing unit. A user computing device may be desktop computer, laptop computer, mobile computing device (e.g., handheld e-mail device, cellular phone, etc. The database or system memory may include read only memory (ROM) and random access memory (RAM). The database may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. User interfaces, as described herein may include a computer with monitor, keyboard, a keypad, a mouse, joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure. Such variations will depend on the software and hardware systems chosen and on designer choice. It is understood that all such variations are within the scope of the invention. Likewise, software and web implementations of the present disclosure could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the present disclosure.

Throughout the specification, numerous advantages of the exemplary embodiments have been identified. It will be understood of course that it is possible to employ the teachings herein without necessarily achieving the same advantages. Additionally, although many features have been described in the context of a particular data processing unit, it will be appreciated that such features could also be implemented in the context of other hardware configurations.

While the exemplary embodiments illustrated in the figures and described above are presently preferred, it should be understood that these embodiments are offered by way of example only. Other embodiments may include, for example, structures with different data mapping or different data. The invention is not limited to a particular embodiment, but extends to various modifications, combinations, and permutations that nevertheless fall within the scope and spirit of the appended claims.

What is claimed is:

1. A method for providing account services, comprising:
   storing, by a computing system, an account services page for an online website or application;
   receiving, by the computing system from a client device, a log-in request via a networked graphical user interface to access the account services page through the online website or application;
   retrieving, by the computing system from a local data storage system and based on the log-in request, first information of an account holder including account information for an account associated with the account services page and financial data associated with the account holder;
   retrieving, by a network interface logic of the computing system, second information of the account holder from a first external source and third information from a second external source, the second information of the account holder comprising a dynamic financial indicator associated with the account holder, the third information regarding a dynamic financial indicator associated with an employer of the account holder;
   determining, by an account status logic of the computing system based on the first information of the account holder, the second information of the account, and third information, that the account has an adverse status;
   in response to determining that the account has an adverse status, generating, by the computing system, a risk assessment regarding the account, wherein the risk assessment comprises a quantification indicating a probability of an adverse event occurring related to the account, and wherein generating the risk assessment comprises:
      accessing first real-time data regarding the account from an internal data source;
      accessing second real-time data regarding non-account specific information from an external data source; and
      assessing the first and second real-time data to generate the quantification indicating the probability of the adverse event occurring;
   identifying, based on a customer preference, a decision of the account holder to opt out of a first interaction channel;
   determining, by the account management system and based on the adverse account status, to override the decision to opt out of the first interaction channel;
   determining, by the account management system, to interact with the account holder via the first interaction channel, the determination based on the adverse account status and registered account activity of the account holder;
   generating, by the computing system, an interruptive splash page, wherein generating the interruptive splash page comprises customizing the interruptive splash page based on the risk assessment, and wherein the interruptive splash page comprises an interruptive graphical user interface having fields selected by the computing system in accordance with customizing the interruptive splash page, wherein the fields comprise:
      adverse account status information;
      at least one account remediation option; and
      an option to proceed to the account services page;
   interrupting, by the computing system, a flow of a normal login process for the account services page by transmitting the interruptive splash page to the client device for display of the interruptive graphical user interface by the client device in place of the account services page that would otherwise have been transmitted during the normal login process;
   delivering, by the computing system using the first interaction channel, an account remediation message to the account holder, the account remediation message including the at least one account remediation option;
   receiving, by the computing system from the client device, a selection, via one of the interruptive graphical user interface or the account remediation message, of a link associated with the at least one account remediation option;
   implementing, by the computing system, the selected account remediation option; and
   after receiving the selection of the link associated with the at least one account remediation option, transmitting the account services page from the computing device to the client device for display via the client device.

2. The method of claim 1, wherein generating the interruptive splash page comprises generating the interruptive splash page to include at least one option to communicate with an account agent.

3. The method of claim 2, further comprising determining, by the computing system, to generate the interruptive splash page to include the at least one option to communicate with the account agent based on a severity of the adverse account status.

4. The method of claim 3, further comprising determining, by the computing system, the severity of the adverse account status is based on a delinquency of a payment being equal to or more than a threshold number of days.

5. The method of claim 3, wherein the at least one option to communicate with the account agent comprises an option to chat with the account agent, an option to talk with the account agent, or an option to schedule a call with the account agent.

6. The method of claim 1, wherein the at least one account remediation option comprises an option to schedule a partial payment.

7. The method of claim 6, further comprising transmitting, by the computing device to the client device, an option to schedule a future payment of a remaining amount owed, for display subsequent to the selection of the option to schedule a partial payment.

8. The method of claim 6, wherein the at least one account remediation option further comprises an option to defer a remediation payment.

9. The method of claim 1, wherein the adverse account status information includes an indication of a lateness of an amount owed.

10. The method of claim 1, wherein the adverse account status information includes an indication that the account has access to sufficient funds to pay an amount owed.

11. The method of claim 1, wherein the dynamic financial indicator associated with an employer of the account holder includes a stock price of the company, a stock price trend for the company, or a business credit rating of the company.

12. A method for account remediation, comprising:
    storing, by a computing system, an account services page for an online website or application;
    receiving, by the computing system from a client device, a log-in request via a networked graphical user interface to access the account services page through the online website or application;
    retrieving, by the computing system from a local data storage system and based on the log-in request, first information of an account holder including account information for an account associated with the account services page and financial data associated with the account holder;
    retrieving, by a network interface logic of the computing system, second information of the account holder from a first external source and third information from a second external source, the second information of the account holder comprising a dynamic financial indicator associated with the account holder, the third information regarding a dynamic financial indicator associated with an employer of the account holder;
    determining, by an account status logic of the computing system based on the first information of the account holder, the second information of the account holder, and the third information, that the account is in an adverse status;
    in response to determining that the account has an adverse status, generating, by the computing system, a risk assessment regarding the account, wherein the risk assessment comprises a quantification indicating a probability of an adverse event occurring related to the account, and wherein generating the risk assessment comprises:
        accessing first real-time data regarding the account from an internal data source;
        accessing second real-time data regarding non-account specific information from an external data source; and
        assessing the first and second real-time data to generate the quantification indicating the probability of the adverse event occurring;
    identifying, based on a customer preference, a decision of the account holder to opt out of a first interaction channel;
    determining, by the account management system and based on the adverse account status, to override the decision to opt out of the first interaction channel;
    determining, by the computing system, to interact with the account holder via the first interaction channel, the determination based on the adverse account status and registered account of the account holder;
    determining, by the computing system, to transmit an interruptive splash page responsive to the determining that the account is in the adverse status, wherein determining to transmit the interruptive splash page comprises customizing the interruptive splash page based on the risk assessment such that the interruptive splash page comprises an interruptive graphical user interface having fields selected by the computing system in accordance with customizing the interruptive splash page;
    interrupting, by the computing system, a flow of a normal login process for the account services page by transmitting, to the client device, the interruptive splash page for display prior to, or instead of, the account services page, the interruptive splash page including the interruptive graphical user interface that displays, in place of the account services page that would otherwise have been transmitted during the normal login process,:
        an indication of the adverse status; and
        a plurality of options for proceeding including an account remediation process;
    delivering, by the computing system via the first interaction channel, an account remediation message to the account holder, the account remediation message including the account remediation process;
    receiving, by the computing system from the client device, a selection, via one of the interruptive graphical user interface or the account remediation message, of a link associated with the account remediation process;
    implementing, by the computing system, the selected account remediation process; and
    after receiving the selection of the link associated with the account remediation process, transmitting the account services page from the computing device to the client device for display via the client device.

13. The method of claim 12, wherein the plurality of options for proceeding include an option to proceed to the account services page.

14. The method of claim 12, further comprising updating the account services page to include a reminder of the adverse account status.

15. The method of claim 14, further comprising storing, by the computing system, a plurality of account services pages including the account services page, and updating the plurality of account services pages to include, in each of the account services pages, the reminder of the adverse account status.

16. The method of claim 12, wherein the account remediation process comprises an option to make a partial payment of an amount owed, the method further comprising:
    transmitting, by the computing system to the client device, a partial payment page including an option to make a partial payment of an amount owed; and
    receiving, by the computing system from the client device, a selection of the option to make the partial payment of the amount owed.

17. The method of claim 16, further comprising transmitting, by the computing system to the client device, an option to schedule future payments for display subsequent to the selection of the option to make the partial payment of the amount owed.

18. The method of claim 12, wherein the account remediation process includes an option to make a full payment of an amount owed, and the receiving the selection of the link associated with the account remediation process includes receiving a selection of the option to make the full payment of the amount owed, the method further comprising transmitting, by the computing system to the client device, a confirmation of the full payment.

19. The method of claim 12, wherein the dynamic financial indicator associated with an employer of the account holder includes a stock price of the company, a stock price trend for the company, or a business credit rating of the company.

20. The method of claim 12, wherein the plurality of options for proceeding include a plurality of selectable accounts for remediation of the adverse account status.

21. A system for providing account services, comprising:
a financial institution enterprise computing system, comprising:
a memory comprising:
a network interface logic;
an account management logic; and
a collections portal logic; and
a processor configured to:
store an account services page for an online website or application using the account management logic;
receive, from a client device, a log-in request via a networked graphical user interface to access the account services page through the online website or application;
retrieve, from a local data storage system and based on the log-in request, first information of an account holder including account information for an account associated with the account services page and financial data associated with the account holder using the account management logic;
retrieve, by the network interface logic, second information of the account holder from a first external source and third information from a second external source, the second information of the account holder comprising a dynamic financial indicator associated with the account holder, the third information regarding a dynamic financial indicator associated with an employer of the account holder;
determine, based on the first information of the account, the second information of the account holder, and the third information, that the account is in an adverse status using the account management logic;
in response to determining that the account has an adverse status, generate a risk assessment regarding the account, wherein the risk assessment comprises a quantification indicating a probability of an adverse event occurring related to the account, and wherein generating the risk assessment comprises:
accessing first real-time data regarding the account from an internal data source;
accessing second real-time data regarding non-account specific information from an external data source; and
assessing the first and second real-time data to generate the quantification indicating the probability of the adverse event occurring;
identify, based on a customer preference, a decision of the account holder to opt out of a first interaction channel;
determine, by the account management logic based on the adverse account status, to override the decision to opt out of the first interaction channel;
determine, by the account management logic, to interact with the account holder via the first interaction channel, the determination based on the adverse account status and registered account activity history of the account holder;
generate, using the collections portal logic, an interruptive splash page, wherein generating the interruptive splash page comprises customizing the interruptive splash page based on the risk assessment, and wherein the interruptive splash page comprises an interruptive graphical user interface having fields selected by the computing system in accordance with customizing the interruptive splash page, wherein the fields comprise:
adverse account status information;
at least one account remediation option; and
an option to proceed to the account services page;
interrupt a flow of a normal login process for the account services page by transmitting the interruptive splash page to the client device for display of the interruptive graphical user interface by the client device using the collections portal logic in place of the account services page that would otherwise have been transmitted during the normal login process;
deliver, using the first interaction channel, an account remediation message to the account holder, the account remediation message including the at least one account remediation option;
receive, from the client device, a selection, via one of the interruptive graphical user interface or the account remediation message, of a link associated with the at least one account remediation option;
implement the selected account remediation option using the account management logic; and
after receiving the selection of the link associated with the at least one account remediation, transmit the account services page from the computing device to the client device for display via the client device.

22. The system of claim 21, wherein the at least one account remediation option comprises an option to schedule a partial payment.

23. The system of claim 22, wherein the processor is further configured to transmit, to the client device using the collections portal logic, an option to schedule a future payment of a remaining amount owed, for display subsequent to the selection of the option to schedule a partial payment.

24. The system of claim 21, wherein the dynamic financial indicator associated with an employer of the account holder includes a stock price of the company, a stock price trend for the company, or a business credit rating of the company.

25. The system of claim 22, further comprising the client device, wherein the client device comprises:
a client device memory; and
a client device processor configured to:
execute a graphical user interface; and receive, from to the computing system, the interruptive splash page as a splash page displayed in the graphical user interface.

26. The system of claim 22, further comprising the client device, wherein the client device comprises:
   a client device memory; and
   a client device processor configured to:
      execute a web browser; and
      receive, from to the computing system, the interruptive splash page as a splash page displayed by the web browser.

27. A non-transitory computer readable media with computer-executable instructions embodied thereon, the computer-executable instructions comprising a network interface logic, an account management logic, and a collections portal logic, wherein the instructions, when executed by a processor of a computing system, cause the computing system to perform a process of account remediation, the process comprising:
   storing, using the account management logic, an account services page for an online website or application;
   receiving, from a client device, a log-in request via a networked graphical user interface to access the account services page through the online website or application;
   retrieving, from a local data storage system using the account management logic based on the log-in request, first information of an account holder including account information for an account associated with the account services page and financial data associated with the account holder;
   retrieving, by the network interface logic, second information of the account holder from a first external source and third information from a second external source, the second information of the customer comprising a dynamic financial indicator associated with the account holder, the third information regarding a dynamic financial indicator associated with an employer of the account holder;
   determining, using the account management logic based on the first information of the account holder, the second information of the account holder, and the third information, that the account is in an adverse status;
   in response to determining that the account has an adverse status, generating a risk assessment regarding the account, wherein the risk assessment comprises a quantification indicating a probability of an adverse event occurring related to the account, and wherein generating the risk assessment comprises:
      accessing first real-time data regarding the account from an internal data source;
      accessing second real-time data regarding non-account specific information from an external data source; and
      assessing the first and second real-time data to generate the quantification indicating the probability of the adverse event occurring;
   identifying, based on a customer preference, a decision of the account holder to opt out of a first interaction channel;
   determining, using the account management logic and based on the adverse account status, to override the decision to opt out of the first interaction channel;
   determining, by the computing system, to interact with the account holder via the first interaction channel, the determination based on the adverse account status and registered account activity of the account holder;
   determining, using the collections portal logic, to transmit an interruptive splash page responsive to the determining that the account is in the adverse status, wherein determining to transmit the interruptive splash page comprises customizing the interruptive splash page based on the risk assessment such that the interruptive splash page comprises an interruptive graphical user interface having fields selected by the computing system in accordance with customizing the interruptive splash page;
   interrupting a flow of a normal login process for the account services page by transmitting, to the client device using the collections portal logic, the interruptive splash page for display prior to, or instead of, the account services page, the interruptive splash page including the interruptive graphical user interface that displays, in place of the account services page that would otherwise have been transmitted during the normal login process,:
      an indication of the adverse status; and
      a plurality of options for proceeding including an account remediation process;
   delivering, by the computing system via the first interaction channel, an account remediation message to the account holder, the account remediation message including the account remediation process;
   receiving, from the client device, a selection of a link associated with the account remediation process via one of the interruptive graphical user interface of the interruptive splash page or account remediation message;
   implementing, using the account management logic, the selected account remediation process; and
   after receiving the selection of the link associated with the account remediation process, transmitting the account services page to the client device for display via the client device.

28. The non-transitory computer readable media of claim 27, wherein the plurality of options for proceeding include an option to proceed to the account services page.

29. The non-transitory computer readable media of claim 27, wherein the process of account remediation further comprises updating the account services page to include a reminder of the adverse account status, using the collections portal logic.

30. The non-transitory computer readable media of claim 27, wherein the dynamic financial indicator associated with an employer of the account holder includes a stock price of the company, a stock price trend for the company, or a business credit rating of the company.

* * * * *